United States Patent
Rabiner et al.

(10) Patent No.: US 7,961,113 B2
(45) Date of Patent: Jun. 14, 2011

(54) NETWORKABLE LED-BASED LIGHTING FIXTURES AND METHODS FOR POWERING AND CONTROLLING SAME

(75) Inventors: Mark D. Rabiner, Cambridge, MA (US); Igor Shikh, Newton Center, MA (US); Derek Logan, Sanford, ME (US); Bill Hart, Roslindale, MA (US); Brian Roberge, Franklin, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 728 days.

(21) Appl. No.: 11/875,196

(22) Filed: Oct. 19, 2007

(65) Prior Publication Data

US 2008/0094005 A1    Apr. 24, 2008

Related U.S. Application Data

(60) Provisional application No. 60/862,183, filed on Oct. 19, 2006.

(51) Int. Cl.
*G05B 19/02* (2006.01)

(52) U.S. Cl. .............................. 340/825.22; 340/825.21

(58) Field of Classification Search ............. 340/825.22, 340/825.21; 345/82, 102, 204, 211–214; 315/247, 246, 185 S, 312–326; 362/800–812, 362/611–613, 630–632, 555
See application file for complete search history.

(56) References Cited

U.S. PATENT DOCUMENTS

| | | | |
|---|---|---|---|
| 6,016,038 A | 1/2000 | Mueller et al. | |
| 6,150,774 A | 11/2000 | Mueller et al. | |
| 6,166,496 A | 12/2000 | Lys et al. | |
| 6,211,626 B1 | 4/2001 | Lys et al. | |
| 6,292,901 B1 | 9/2001 | Lys et al. | |
| 6,340,868 B1 | 1/2002 | Lys et al. | |
| D457,667 S | 5/2002 | Piepgras et al. | |
| D457,669 S | 5/2002 | Piepgras et al. | |
| D457,974 S | 5/2002 | Piepgras et al. | |
| D458,395 S | 6/2002 | Piepgras et al. | |
| D463,610 S | 9/2002 | Piepgras et al. | |
| 6,459,919 B1 | 10/2002 | Lys et al. | |
| D468,035 S | 12/2002 | Blanc et al. | |
| 6,528,954 B1 | 3/2003 | Lys et al. | |
| 6,548,967 B1 | 4/2003 | Dowling et al. | |
| 6,577,080 B2 | 6/2003 | Lys et al. | |
| 6,608,453 B2 | 8/2003 | Morgan et al. | |
| 6,624,597 B2 | 9/2003 | Dowling et al. | |
| 6,636,003 B2 | 10/2003 | Rahm et al. | |
| 6,717,376 B2 | 4/2004 | Lys et al. | |
| 6,720,745 B2 | 4/2004 | Lys et al. | |
| D491,678 S | 6/2004 | Piepgras et al. | |
| D492,042 S | 6/2004 | Piepgras et al. | |
| 6,774,584 B2 | 8/2004 | Lys et al. | |

(Continued)

*Primary Examiner* — Tuyet Thi Vo

(74) *Attorney, Agent, or Firm* — Mark L. Beloborodov

(57) ABSTRACT

A lighting fixture, and methods for powering and operating same. The fixture comprises a housing having multiple portions. One or more power and control circuit boards are disposed in a first portion of the housing, comprising one or more switching power supplies for receiving an A.C. line voltage and providing a D.C. output voltage, and a communication protocol converter for receiving first lighting instructions formatted according to a first communication protocol and converting at least some of the first lighting instructions to second lighting instructions formatted according to a second communication protocol. A plurality of modular circuit boards are disposed in the second portion of the housing and coupled to the power and control circuit board(s). Each modular circuit board comprises a plurality of LED-based lighting units coupled to the D.C. output voltage and responsive to the second lighting instructions formatted according to the second communication protocol.

12 Claims, 16 Drawing Sheets

U.S. PATENT DOCUMENTS

| | | |
|---|---|---|
| 6,777,891 B2 | 8/2004 | Lys et al. |
| 6,781,329 B2 | 8/2004 | Mueller et al. |
| 6,788,011 B2 | 9/2004 | Mueller et al. |
| 6,801,003 B2 | 10/2004 | Schanberger et al. |
| 6,806,659 B1 | 10/2004 | Mueller et al. |
| 6,869,204 B2 | 3/2005 | Morgan et al. |
| 6,883,929 B2 | 4/2005 | Dowling |
| 6,888,322 B2 | 5/2005 | Dowling et al. |
| 6,897,624 B2 | 5/2005 | Lys et al. |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| D518,218 S | 3/2006 | Roberge et al. |
| 7,014,336 B1 | 3/2006 | Ducharme et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,064,498 B2 | 6/2006 | Dowling et al. |
| 7,113,541 B1 | 9/2006 | Lys et al. |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,187,141 B2 | 3/2007 | Mueller et al. |
| 7,202,613 B2 | 4/2007 | Morgan et al. |
| 7,204,622 B2 | 4/2007 | Dowling et al. |
| 7,220,015 B2 | 5/2007 | Dowling |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,248,239 B2 | 7/2007 | Dowling et al. |
| D548,868 S | 8/2007 | Roberge et al. |
| 7,253,566 B2 | 8/2007 | Lys et al. |
| 7,255,457 B2 | 8/2007 | Ducharme et al. |
| 7,256,554 B2 | 8/2007 | Lys |
| 7,274,160 B2 | 9/2007 | Mueller et al. |
| 7,300,192 B2 | 11/2007 | Mueller et al. |
| 7,303,300 B2 | 12/2007 | Dowling et al. |
| 7,308,296 B2 | 12/2007 | Lys et al. |
| 7,309,965 B2 | 12/2007 | Dowling et al. |
| D562,494 S | 2/2008 | Piepgras et al. |
| 2002/0074559 A1 | 6/2002 | Dowling et al. |
| 2002/0078221 A1 | 6/2002 | Blackwell et al. |
| 2002/0130627 A1 | 9/2002 | Morgan et al. |
| 2002/0152045 A1 | 10/2002 | Dowling et al. |
| 2002/0176259 A1 | 11/2002 | Ducharme |
| 2003/0057884 A1 | 3/2003 | Dowling et al. |
| 2003/0076281 A1 | 4/2003 | Morgan et al. |
| 2003/0133292 A1 | 7/2003 | Mueller et al. |
| 2004/0052076 A1 | 3/2004 | Mueller et al. |
| 2004/0105261 A1 | 6/2004 | Ducharme et al. |
| 2004/0116039 A1 | 6/2004 | Mueller et al. |
| 2004/0141321 A1 | 7/2004 | Dowling et al. |
| 2004/0160199 A1 | 8/2004 | Morgan et al. |
| 2004/0212993 A1 | 10/2004 | Morgan et al. |
| 2005/0035728 A1 | 2/2005 | Schanberger et al. |
| 2005/0041161 A1 | 2/2005 | Dowling et al. |
| 2005/0047134 A1 | 3/2005 | Mueller et al. |
| 2005/0063194 A1 | 3/2005 | Lys et al. |
| 2005/0099824 A1 | 5/2005 | Dowling et al. |
| 2005/0116667 A1 | 6/2005 | Mueller et al. |
| 2005/0151489 A1 | 7/2005 | Lys et al. |
| 2005/0174473 A1 | 8/2005 | Morgan et al. |
| 2005/0213352 A1 | 9/2005 | Lys et al. |
| 2005/0213353 A1 | 9/2005 | Lys |
| 2005/0218870 A1 | 10/2005 | Lys |
| 2005/0219872 A1 | 10/2005 | Lys |
| 2005/0236998 A1 | 10/2005 | Mueller |
| 2005/0248299 A1 | 11/2005 | Chemel et al. |
| 2005/0253533 A1 | 11/2005 | Lys et al. |
| 2005/0275626 A1 | 12/2005 | Mueller |
| 2005/0276053 A1 | 12/2005 | Nortrup |
| 2005/0289279 A1 | 12/2005 | Fails et al. |
| 2006/0002110 A1 | 1/2006 | Dowling |
| 2006/0012987 A9 | 1/2006 | Ducharme |
| 2006/0016960 A1 | 1/2006 | Morgan |
| 2006/0022214 A1 | 2/2006 | Morgan |
| 2006/0076908 A1 | 4/2006 | Morgan |
| 2006/0098077 A1 | 5/2006 | Dowling |
| 2006/0104058 A1 | 5/2006 | Chemel et al. |
| 2006/0109649 A1 | 5/2006 | Ducharme et al. |
| 2006/0132061 A1 | 6/2006 | McCormick et al. |
| 2006/0152172 A9 | 7/2006 | Mueller |
| 2006/0158881 A1 | 7/2006 | Dowling |
| 2006/0170376 A1 | 8/2006 | Piepgras et al. |
| 2006/0198128 A1 | 9/2006 | Piepgras et al. |
| 2006/0208667 A1 | 9/2006 | Lys |
| 2006/0221606 A1 | 10/2006 | Dowling |
| 2006/0262521 A1 | 11/2006 | Piepgras |
| 2006/0262544 A1 | 11/2006 | Piepgras |
| 2006/0262545 A1 | 11/2006 | Piepgras |
| 2006/0273741 A1 | 12/2006 | Stalker, III |
| 2006/0285325 A1 | 12/2006 | Ducharme et al. |
| 2007/0086754 A1 | 4/2007 | Lys et al. |
| 2007/0086912 A1 | 4/2007 | Dowling |
| 2007/0115658 A1 | 5/2007 | Mueller et al. |
| 2007/0115665 A1 | 5/2007 | Mueller et al. |
| 2007/0145915 A1 | 6/2007 | Roberge et al. |
| 2007/0152797 A1 | 7/2007 | Chemel et al. |
| 2007/0153514 A1 | 7/2007 | Dowling |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0206375 A1 | 9/2007 | Piegras et al. |
| 2007/0236156 A1 | 10/2007 | Lys et al. |
| 2007/0237284 A1 | 10/2007 | Lys et al. |
| 2007/0258231 A1 | 11/2007 | Koerner et al. |
| 2007/0258240 A1 | 11/2007 | Ducharme et al. |
| 2007/0263379 A1 | 11/2007 | Dowling et al. |
| 2007/0291483 A1 | 12/2007 | Lys et al. |
| 2008/0012502 A1 | 1/2008 | Lys |
| 2008/0012506 A1 | 1/2008 | Mueller et al. |

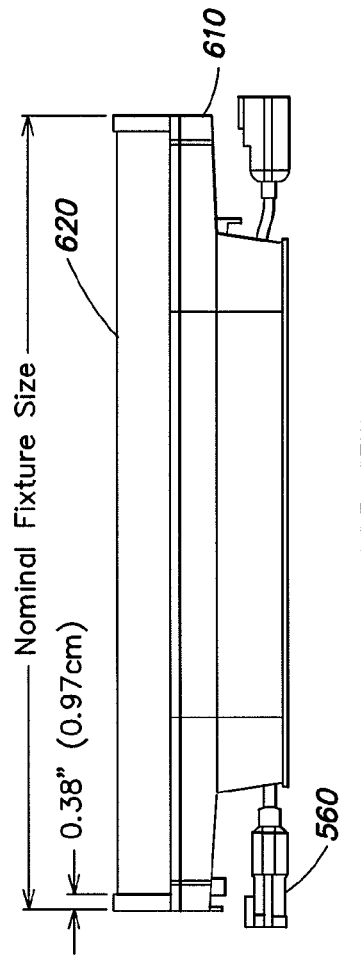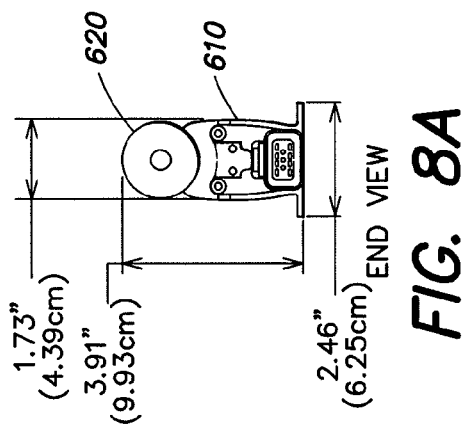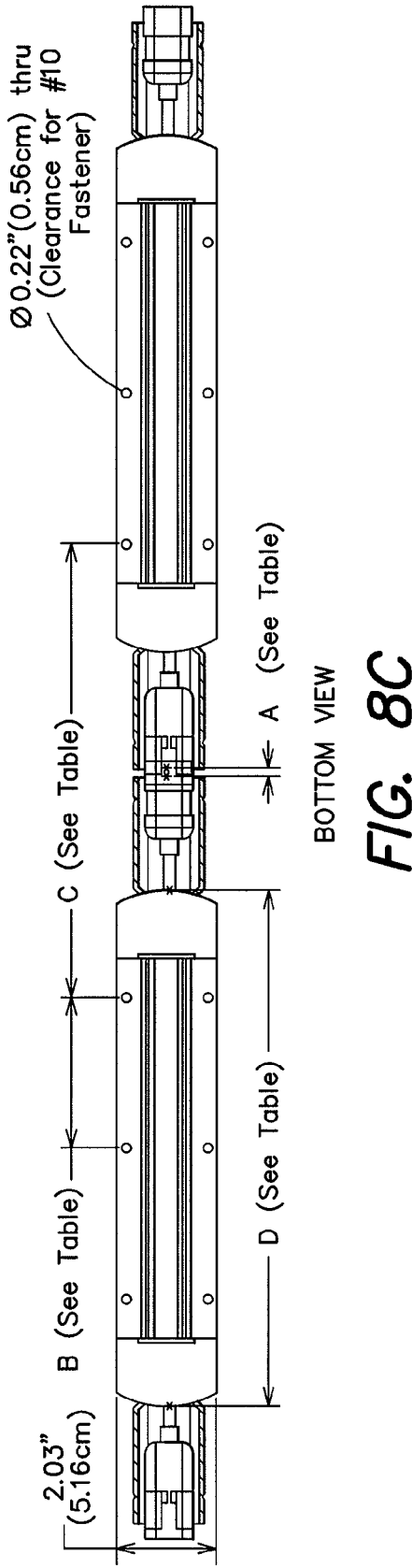
FIG. 8A END VIEW
FIG. 8B SIDE VIEW
FIG. 8C BOTTOM VIEW

NETWORKABLE LED-BASED LIGHTING FIXTURES AND METHODS FOR POWERING AND CONTROLLING SAME

CROSS-REFERENCE TO RELATED APPLICATION

The present application claims the benefit, under 35 U.S.C. §119(e), of U.S. Provisional Application Ser. No. 60/862,183, filed Oct. 19, 2006, entitled "Lighting Fixtures Comprising Multiple Lighting Units and Methods for Powering And Controlling Thereof," which provisional application is hereby incorporated herein by reference.

BACKGROUND

The advent of digital lighting technologies, i.e. illumination based on semiconductor light sources, such as light-emitting diodes (LEDs), offers a viable alternative to traditional fluorescent, HID, and incandescent lamps. Functional advantages and benefits of LEDs include high energy conversion and optical efficiency, robustness, lower operating costs, and many others. The LEDs' smaller size, long operating life, low energy consumption, and durability make them a great choice in a variety of lighting applications. For example, it is becoming increasingly popular to create lighting networks of LED-based devices, as described in U.S. Pat. Nos. 6,016,038, 6,150,774 and 6,166,496, all incorporated herein by reference. These lighting devices have integral microprocessors for controlling LED light sources therein and can produce any color and any sequence of colors at varying intensities and saturations, enabling a wide range of eye-catching lighting effects, in both illumination and direct-view applications.

These lighting systems and the effects they produce are generally controlled and coordinated through a network (although there are many non-networked applications), wherein a data stream containing packets of information is communicated to the lighting devices. Each of the lighting devices may register all of the packets of information passed through the system, but only respond to packets that are addressed to the particular device. Once a properly addressed packet of information arrives, the lighting device may read the packet and execute commands based on information contained in the packet. This arrangement demands that each of the lighting devices has an address and these addresses need to be unique with respect to the other lighting devices on the network. The addresses are normally set by setting switches on each of the lighting devices during installation. Settings switches tends to be time consuming and error prone.

Lighting systems for entertainment, retail, and architectural venues, such as theaters, casinos, theme parks, stores, and shopping malls, require an assortment of elaborate lighting fixtures and control systems to operate the lights. Conventional networked lighting devices have their addresses set through a series of physical switches such as dials, dipswitches or buttons. These devices have to be individually set to particular addresses and this process can be cumbersome. In fact, one of the lighting designers' most onerous tasks—system configuration—comes after all the lights are installed. This task typically requires at least two people and involves going to each lighting instrument or fixture and determining and setting the network address for it through the use of switches or dials and then determining the setup and corresponding element on a lighting board or computer. Not surprisingly, the configuration of a lighting network can take many hours, depending on the location and complexity. For example, a new amusement park ride may use hundreds of network-controlled lighting fixtures, which are neither line-of-sight to each other or to any single point. Each one must be identified and linked to its setting on the lighting control board. Mix-ups and confusion are common during this process. With sufficient planning and coordination this address selection and setting can be done a priori but still requires substantial time and effort.

There are several other disadvantages associated with these lighting systems, particularly with those designed for direct view applications. Specifically, there are many installations that require long lines of component fixtures placed in a row or other pattern in an attempt to produce a continuous light line to display a visually-pleasing effect for the viewer, for example, to outline the perimeter of a building with accent lighting. Conventional lighting networks, however, often produce little or no light in the gaps between adjoining fixtures, which tend to detract from the intended appearance of these installations. In addition, because each of the components is addressed individually, the degree of coordination of the lighting effects, i.e. "resolution" of the application, is limited to the size of the components. For example, in a linear installation having a number of 1-foot long components, the components cannot be addressed any finer than in 1-foot increments. Also, another disadvantage of these systems is that when the LEDs are directly viewed they appear to be discrete light emitters until there is sufficient distance between the light and the viewer. Even when the viewer is relatively far away from the lighting system, the lighting system does not tend to produce very bright or clearly perceivable lighting effects.

Another shortcoming associated with many conventional lighting systems is that their components are externally powered, such that both communication and power lines are fed through the ends of the housing and into junction boxes at the beginning and end of every component fixture. The three lines, power, ground, and data, are run through each end and then passed through the length of the fixture. Each lighting element in the housing would tap into the three lines for power and data. Mounting of the fixtures is very expensive and cumbersome because it is implemented through junction boxes. Every light requires two junction boxes to be mounted on the wall or other mounting surface, and wires and conduit need to be run between boxes to allow two lighting units to be connected together.

Accordingly, there is a need in the art for versatile LED-based lighting fixtures capable of creating visually-pleasing color and color-changing lighting effects with enhanced control resolution and efficient power management, which are easy to install in a network.

SUMMARY OF THE INVENTION

The technology disclosed herein addresses the disadvantages and shortcomings mentioned above and generally relates to lighting units of a variety of types and configurations, including linear lighting fixtures comprising multiple LED-based lighting units suitable for illuminating or provide accent lighting for large spaces, such as building exteriors and interiors. Also disclosed are methods and systems for powering and controlling these lighting fixtures and systems employing multiple such fixtures, as well as techniques for addressing control data for such fixtures and systems.

In various embodiments and implementations, this technology and its inventive aspects are directed to lighting fixtures that include one or more circuit boards and a plurality of light sources, for example, LEDs disposed along the circuit board(s). The circuit board(s) and the light sources are disposed in a housing associated with a light-transmissive casing. A connection facility of the housing allows a first lighting fixture to connect end-to-end with a second lighting fixture without a gap (e.g., in perceived light emission) between the housings. For example, the connection facility may include a passageway that allows power and/or data lines to exit the housing at a location other than the end of the housing. The circuit board(s) and the housing may be substantially linear, curved, bent, branched, or in a "T" or "V" shape, among other shapes.

In many embodiments of the invention, the housing includes a first portion made of extruded aluminum that is mechanically associated with, and preferably sealably connected to, a second portion comprising a translucent optics casing (e.g., which may be made of extruded polycarbonate). The plurality of the light sources is arranged on the circuit board(s) to provide substantially uniform illumination of at least a portion of the casing disposed over the circuit board(s). In other words, a substantial portion of light from the light sources is projected within a beam angle aligned to project light onto the interior surface of the optic and the alignment is optimized to generate substantially uniform illumination of the portion of the optic visible to the viewer. In some implementations, LEDs are arranged on the circuit board(s) in two rows, such that the beam angle is formed by the light emitted by the two rows of LEDs.

Each circuit board may also include a processor, for example, an application-specific integrated circuit (ASIC), configured to receive and transmit a data stream, as described in detail in U.S. Pat. No. 6,777,891, incorporated herein by reference. Accordingly, in some implementations, the present technology contemplates disposing a plurality of lighting units in a serial configuration within the lighting fixture and controlling all of them by a stream of data to respective ASICs of each of them, wherein each lighting unit responds to the first unmodified bit of data in the stream, modifies that bit of data, and transmits the stream to the next ASIC.

A communication facility can also be provided, whereby the lighting fixture responds to data from a signal source exterior to the lighting fixture. The signal source may be a wireless signal source and may generate a signal based on a scripted lighting program for the lighting fixture. In particular implementations, the technology disclosed herein contemplates a data/signal conversion module for receiving a control signal through an Ethernet protocol and converting it to a format readable by the respective ASICs of the lighting units of the lighting fixture.

The present technology further contemplates a power supply for powering the lighting fixture, for example, a two-stage power-factor-controlled power supply. The power factor correction module of the power supply may include an energy storage capacitor and a DC-DC converter separated by a bus. In particular implementations, each lighting unit of the lighting fixture includes a power module, enabling the units to accept a line voltage, thereby simplifying the installation and improving durability of the lighting units, as described U.S. Pat. No. 7,233,115, incorporated herein by reference.

The control of the lighting fixture can be based on assignment of the fixture's lighting units as objects in an object-oriented computer program (for example, an authoring system that relates attributes in a virtual system to real world attributes of lighting systems, including positions of individual lighting units of the lighting system).

In some implementations, the multi-lighting unit lighting fixtures described above can be disposed in an array on a building and configured to (i) facilitate displaying at least one of a number, a word, a letter, a logo, a brand, and a symbol; and/or (ii) configured to display a light show with various time-based effects. In other implementations, the lighting fixtures described herein are configured to be recessed into an alcove or similar facility.

Generally, in one aspect, the invention focuses on a lighting fixture including a housing having a least a first portion and a second portion and at least one power and control circuit board disposed in the first portion of the housing. The power and control circuit board includes at least one switching power supply for receiving an A.C. line voltage and providing a D.C. output voltage; and a communication protocol converter for receiving first lighting instructions formatted according to a first communication protocol and converting at least some of the first lighting instructions to second lighting instructions formatted according to a second communication protocol. The lighting fixture further includes a plurality of modular circuit boards disposed in the second portion of the housing and coupled to the at least one power and control circuit board. Each modular circuit board of the plurality of modular circuit boards includes a plurality of LED-based lighting units coupled to the D.C. output voltage and responsive to the second lighting instructions formatted according to the second communication protocol.

In another aspect, the invention focuses on a modular LED-based lighting fixture that includes (i) an input connector for receiving an A.C. line voltage and first lighting instructions formatted according to a first communication protocol; (ii) an output connector for providing the A.C. line voltage and the first lighting instructions formatted according to the first communication protocol; (iii) a communication protocol converter coupled to the input connector for converting at least some of the first lighting instructions formatted according to the first communication protocol into second lighting instructions formatted according to a second communication protocol; and (iv) a plurality of LED-based lighting units coupled to the communication protocol converter and configured to receive the second lighting instructions formatted according to the second communication protocol. Each LED-based lighting unit of the plurality of LED-based lighting units is individually and independently controllable in response to at least some of the second lighting instructions.

In still another aspect, the invention is directed to a modular LED-based lighting fixture that includes (i) an input connector for receiving an A.C. line voltage and first lighting instructions formatted according to an Ethernet-based protocol; (ii) an output connector for providing the A.C. line voltage and the first lighting instructions formatted according to the Ethernet-based protocol; (iii) at least one switching power supply coupled to the input connector for converting the A.C. line voltage to a D.C. output voltage; and (iv) a plurality of LED-based lighting units coupled to the D.C. output voltage. Each LED-based lighting unit of the plurality of LED-based lighting units is individually and independently controllable based on information contained in the first lighting instructions.

Further, in yet another aspect, the invention is directed to a linear lighting fixture that includes a plurality of serially-connected modular circuit boards. Each modular circuit board includes a plurality of individually and independently controllable serially-connected LED-based lighting units, such that all LED-based lighting units on all serially-connected modular circuit boards are serially-interconnected. Each LED-based lighting unit includes (i) at least one first LED for generating first radiation having a first spectrum; (ii) at least one second LED for generating second radiation having a second spectrum different from the first spectrum; and (iii) an application-specific integrated circuit (ASIC) for controlling at least a first intensity of the first radiation and a second intensity of the second radiation in response to first lighting instructions formatted according to a serial-based communication protocol.

Also, the invention contemplates a lighting system that includes a first plurality of serially-connected modular lighting fixtures. At least a first modular lighting fixture of the first plurality of serially-connected modular lighting fixtures is configured to receive both an A.C. line voltage and Ethernet-based communications via a first single multiple-conductor cable. Each modular lighting fixture includes (i) at least one switching power supply to convert the A.C. line voltage to a D.C. output voltage; (ii) a communication protocol converter to convert the Ethernet-based communications to lighting instructions formatted according to a serial-based protocol; and (iii) a plurality of serially-connected LED-based lighting units coupled to the D.C. voltage for generating variable color, variable color temperature, and/or variable intensity light based on the lighting instructions formatted according to the serial-based protocol.

RELEVANT TERMINOLOGY

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

RELATED PATENTS AND PATENT APPLICATIONS

The following patents and patent applications are hereby incorporated herein by reference:

U.S. Pat. No. 6,016,038, issued Jan. 18, 2000, entitled "Multicolored LED Lighting Method and Apparatus;"

U.S. Pat. No. 6,211,626, issued Apr. 3, 2001, entitled "Illumination Components;"

U.S. Pat. No. 6,608,453, issued Aug. 19, 2003, entitled "Methods and Apparatus for Controlling Devices in a Networked Lighting System;"

U.S. Pat. No. 6,777,891 issued Aug. 17, 2004, entitled "Methods and Apparatus for Controlling Devices in a Networked Lighting System;"

U.S. Pat. No. 6,717,376, issued Apr. 6, 2004, entitled "Automotive Information Systems;"

U.S. Pat. No. 7,161,311, issued Jan. 9, 2007, entitled "Multicolored LED Lighting Method and Apparatus;"

U.S. Pat. No. 7,202,613, issued Apr. 10, 2007, entitled "Controlled Lighting Methods and Apparatus;"

U.S. Pat. No. 7,233,115, issued Jun. 19, 2007, entitled "LED-Based Lighting Network Power Control Methods and Apparatus;"

U.S. Patent Application Publication No. 2005-0213353, filed Sep. 29, 2005, entitled "LED Power Control Methods and Apparatus;"

U.S. Patent Application Publication No. 2005-0248299, published Nov. 10, 2005, entitled "Light System Manager;"

U.S. Patent Application Publication No. 2006-0002110, published Jan. 5, 2006, entitled "Methods and Systems for Providing Lighting Systems;" and U.S. Patent Application Publication No. 2007-0188114, published Aug. 17, 2007, entitled "Methods and Apparatus for High Power Factor Controlled Power Delivery Using a Single Switching Stage Per Load."

BRIEF DESCRIPTION OF THE DRAWINGS

FIGS. 7, 8A, 8B and 8C illustrate various structural aspects of one embodiment of the present invention directed to a modular essentially linear lighting fixture that is configured to house multiple lighting units similar to those discussed above in connection with FIGS. 1-6.

DETAILED DESCRIPTION

Various embodiments of the present invention are described below, including certain embodiments relating particularly to LED-based light sources. It should be appreciated, however, that the present disclosure is not limited to any particular manner of implementation, and that the various embodiments discussed explicitly herein are primarily for purposes of illustration. For example, the various concepts discussed herein may be suitably implemented in a variety of environments involving LED-based light sources, other types of light sources not including LEDs, environments that involve both LEDs and other types of light sources in combination, and environments that involve non-lighting-related devices alone or in combination with various types of light sources.

Figure 1:
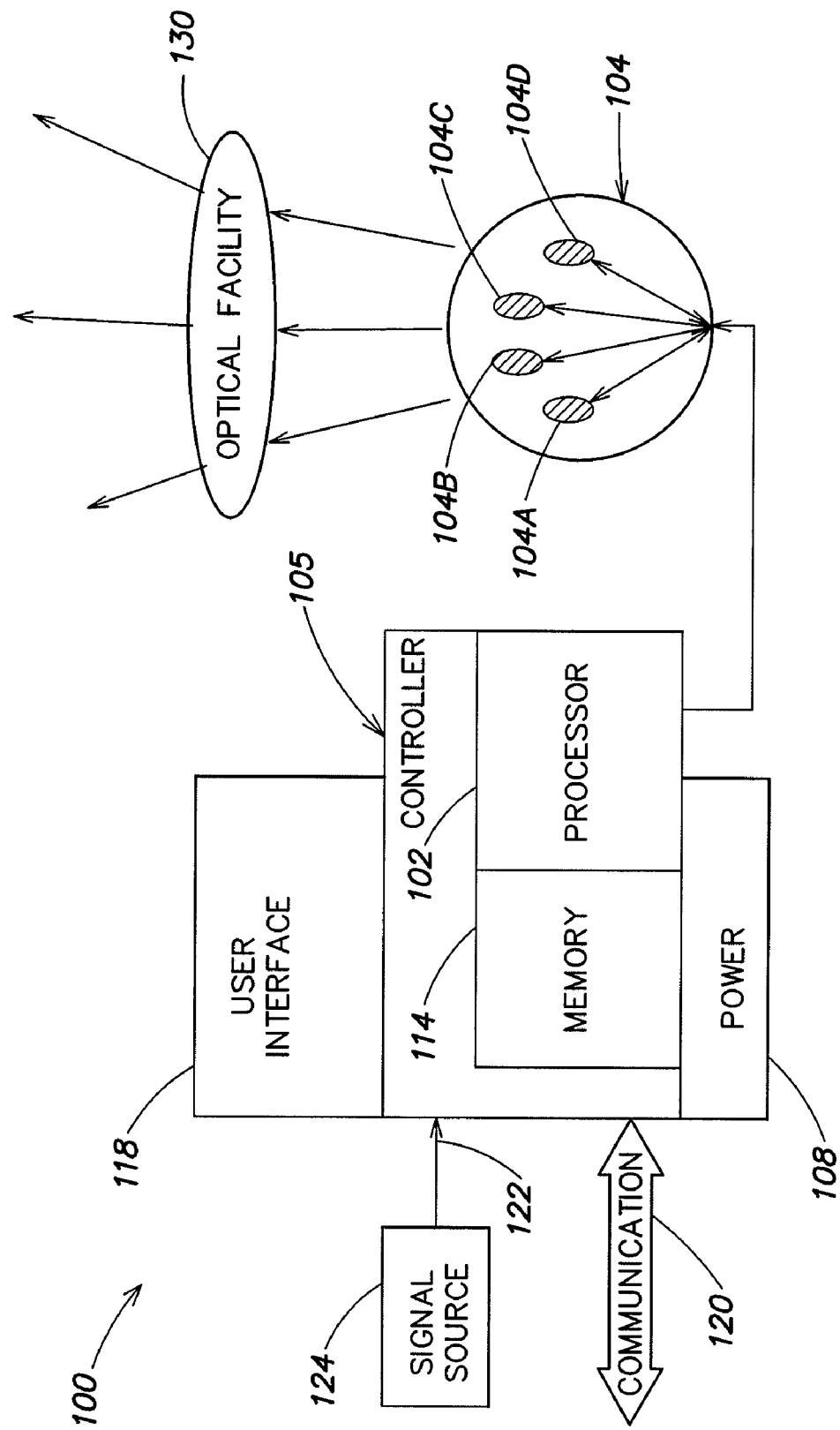
FIG. 1 is a diagram illustrating a lighting unit according to one embodiment of the invention.

FIG. 1 illustrates one example of a lighting unit 100 according to one embodiment of the present invention. Some general examples of LED-based lighting units similar to those that are described below in connection with FIG. 1 may be found, for example, in U.S. Pat. No. 6,016,038, issued Jan. 18, 2000 to Mueller et al., entitled "Multicolored LED Lighting Method and Apparatus," and U.S. Pat. No. 6,211,626, issued Apr. 3, 2001 to Lys et al, entitled "Illumination Components," which patents are both hereby incorporated herein by reference.

In various embodiments of the present invention, the lighting unit 100 shown in FIG. 1 may be used alone or together with other similar lighting units in a system of lighting units (e.g., as discussed further below in connection with FIG. 3).

Used alone or in combination with other lighting units, the lighting unit 100 may be employed in a variety of applications including, but not limited to, direct-view or indirect-view interior or exterior space (e.g., architectural) lighting and illumination in general, direct or indirect illumination of objects or spaces, theatrical or other entertainment-based/special effects lighting, decorative lighting, safety-oriented lighting, lighting associated with, or illumination of, displays and/or merchandise (e.g. for advertising and/or in retail/consumer environments), combined lighting or illumination and communication systems, etc., as well as for various indication, display and informational purposes.

The lighting unit 100 shown in FIG. 1 may include one or more light sources 104A, 104B, 104C, and 104D (shown collectively as 104), wherein one or more of the light sources may be an LED-based light source that includes one or more LEDs. Any two or more of the light sources may be adapted to generate radiation of different colors (e.g. red, green, blue); in this respect, as discussed above, each of the different color light sources generates a different source spectrum that constitutes a different "channel" of a "multi-channel" lighting unit. Although FIG. 1 shows four light sources 104A, 104B, 104C, and 104D, it should be appreciated that the lighting unit is not limited in this respect, as different numbers and various types of light sources (all LED-based light sources, LED-based and non-LED-based light sources in combination, etc.) adapted to generate radiation of a variety of different colors, including essentially white light, may be employed in the lighting unit 100, as discussed further below.

Still referring to FIG. 1, the lighting unit 100 also may include a controller 105 that is configured to output one or more control signals to drive the light sources so as to generate various intensities of light from the light sources. For example, in one implementation, the controller 105 may be configured to output at least one control signal for each light source so as to independently control the intensity of light (e.g., radiant power in lumens) generated by each light source; alternatively, the controller 105 may be configured to output one or more control signals to collectively control a group of two or more light sources identically. Some examples of control signals that may be generated by the controller to control the light sources include, but are not limited to, pulse modulated signals, pulse width modulated signals (PWM), pulse amplitude modulated signals (PAM), pulse code modulated signals (PCM) analog control signals (e.g., current control signals, voltage control signals), combinations and/or modulations of the foregoing signals, or other control signals. In some implementations, particularly in connection with LED-based sources, one or more modulation techniques provide for variable control using a fixed current level applied to one or more LEDs, so as to mitigate potential undesirable or unpredictable variations in LED output that may arise if a variable LED drive current were employed. In other implementations, the controller 105 may control other dedicated circuitry (not shown in FIG. 1) which in turn controls the light sources so as to vary their respective intensities.

In general, the intensity (radiant output power) of radiation generated by the one or more light sources is proportional to the average power delivered to the light source(s) over a given time period. Accordingly, one technique for varying the intensity of radiation generated by the one or more light sources involves modulating the power delivered to (i.e., the operating power of) the light source(s). For some types of light sources, including LED-based sources, this may be accomplished effectively using a pulse width modulation (PWM) technique.

In one exemplary implementation of a PWM control technique, for each channel of a lighting unit a fixed predetermined voltage $V_{source}$ is applied periodically across a given light source constituting the channel. The application of the voltage $V_{source}$ may be accomplished via one or more switches, not shown in FIG. 1, controlled by the controller 105. While the voltage $V_{source}$ is applied across the light source, a predetermined fixed current $I_{source}$ (e.g., determined by a current regulator, also not shown in FIG. 1) is allowed to flow through the light source. Again, recall that an LED-based light source may include one or more LEDs, such that the voltage $V_{source}$ may be applied to a group of LEDs constituting the source, and the current $I_{source}$ may be drawn by the group of LEDs. The fixed voltage $V_{source}$ across the light source when energized, and the regulated current $I_{source}$ drawn by the light source when energized, determines the amount of instantaneous operating power $P_{source}$ of the light source ($P_{source} = V_{source} \cdot I_{source}$). As mentioned above, for LED-based light sources, using a regulated current mitigates potential undesirable or unpredictable variations in LED output that may arise if a variable LED drive current were employed.

According to the PWM technique, by periodically applying the voltage $V_{source}$ to the light source and varying the time the voltage is applied during a given on-off cycle, the average power delivered to the light source over time (the average operating power) may be modulated. In particular, the controller 105 may be configured to apply the voltage $V_{source}$ to a given light source in a pulsed fashion (e.g., by outputting a control signal that operates one or more switches to apply the voltage to the light source), preferably at a frequency that is greater than that capable of being detected by the human eye (e.g., greater than approximately 100 Hz). In this manner, an observer of the light generated by the light source does not perceive the discrete on-off cycles (commonly referred to as a "flicker effect"), but instead the integrating function of the eye perceives essentially continuous light generation. By adjusting the pulse width (i.e. on-time, or "duty cycle") of on-off cycles of the control signal, the controller varies the average amount of time the light source is energized in any given time period, and hence varies the average operating power of the light source. In this manner, the perceived brightness of the generated light from each channel in turn may be varied.

As discussed in greater detail below, the controller 105 may be configured to control each different light source channel of a multi-channel lighting unit at a predetermined average operating power to provide a corresponding radiant output power for the light generated by each channel. Alternatively, the controller 105 may receive instructions (e.g., "lighting commands") from a variety of origins, such as a user interface 118, a signal source 124, or one or more communication ports 120, that specify prescribed operating powers for one or more channels and, hence, corresponding radiant output powers for the light generated by the respective channels. By varying the prescribed operating powers for one or more channels (e.g., pursuant to different instructions or lighting commands), different perceived colors and brightness levels of light may be generated by the lighting unit.

In some implementations of the lighting unit 100, as mentioned above, one or more of the light sources 104A, 104B, 104C, and 104D shown in FIG. 1 may include a group of multiple LEDs or other types of light sources (e.g., various parallel and/or serial connections of LEDs or other types of light sources) that are controlled together by the controller 105. Additionally, it should be appreciated that one or more of the light sources may include one or more LEDs that are adapted to generate radiation having any of a variety of spectra (i.e., wavelengths or wavelength bands), including, but not limited to, various visible colors (including essentially white light), various color temperatures of white light, ultraviolet, or infrared. LEDs having a variety of spectral bandwidths (e.g., narrow band, broader band) may be employed in various implementations of the lighting unit 100.

The lighting unit 100 may be constructed and arranged to produce a wide range of variable color radiation. For example, in one implementation, the lighting unit 100 may be particularly arranged such that controllable variable intensity (i.e., variable radiant power) light generated by two or more of the light sources combines to produce a mixed colored light (including essentially white light having a variety of color temperatures). In particular, the color (or color temperature) of the mixed colored light may be varied by varying one or more of the respective intensities (output radiant power) of the light sources (e.g., in response to one or more control signals output by the controller 105). Furthermore, the controller 105 may be particularly configured to provide control signals to one or more of the light sources so as to generate a variety of static or time-varying (dynamic) multi-color (or multi-color temperature) lighting effects. To this end, the controller may include a processor 102 (e.g., a microprocessor) programmed to provide such control signals to one or more of the light sources. In various implementations, the processor 102 may be programmed to provide such control signals autonomously, in response to lighting commands, or in response to various user or signal inputs.

Thus, the lighting unit 100 may include a wide variety of colors of LEDs in various combinations, including two or more of red, green, and blue LEDs to produce a color mix, as well as one or more other LEDs to create varying colors and color temperatures of white light. For example, red, green and blue can be mixed with amber, white, UV, orange, IR or other colors of LEDs. Additionally, multiple white LEDs having different color temperatures (e.g., one or more first white LEDs that generate a first spectrum corresponding to a first color temperature, and one or more second white LEDs that generate a second spectrum corresponding to a second color temperature different than the first color temperature) may be employed, in an all-white LED lighting unit or in combination with other colors of LEDs. Such combinations of differently colored LEDs and/or different color temperature white LEDs in the lighting unit 100 can facilitate accurate reproduction of a host of desirable spectrums of lighting conditions, examples of which include, but are not limited to, a variety of outside daylight equivalents at different times of the day, various interior lighting conditions, lighting conditions to simulate a complex multicolored background, and the like. Other desirable lighting conditions can be created by removing particular pieces of spectrum that may be specifically absorbed, attenuated or reflected in certain environments. Water, for example tends to absorb and attenuate most non-blue and non-green colors of light, so underwater applications may benefit from lighting conditions that are tailored to emphasize or attenuate some spectral elements relative to others.

As shown in FIG. 1, the lighting unit 100 also may include a memory 114 to store various data. For example, the memory 114 may be employed to store one or more lighting commands or programs for execution by the processor 102 (e.g., to generate one or more control signals for the light sources), as well as various types of data useful for generating variable color radiation (e.g., calibration information, discussed further below). The memory 114 also may store one or more particular identifiers (e.g., a serial number, an address, etc.) that may be used either locally or on a system level to identify the lighting unit 100. In various embodiments, such identifiers may be pre-programmed by a manufacturer, for example, and may be either alterable or non-alterable thereafter (e.g., via some type of user interface located on the lighting unit, via one or more data or control signals received by the lighting unit, etc.). Alternatively, such identifiers may be determined at the time of initial use of the lighting unit in the field, and again may be alterable or non-alterable thereafter.

One issue that may arise in connection with controlling multiple light sources in the lighting unit 100 of FIG. 1, and controlling multiple lighting units 100 in a lighting system (e.g., as discussed below in connection with FIG. 2), relates to potentially perceptible differences in light output between substantially similar light sources. For example, given two virtually identical light sources being driven by respective identical control signals, the actual intensity of light (e.g., radiant power in lumens) output by each light source may be measurably different. Such a difference in light output may be attributed to various factors including, for example, slight manufacturing differences between the light sources, normal wear and tear over time of the light sources that may differently alter the respective spectrums of the generated radiation, etc. For purposes of the present discussion, light sources for which a particular relationship between a control signal and resulting output radiant power are not known are referred to as "uncalibrated" light sources. The use of one or more uncalibrated light sources in the lighting unit 100 shown in FIG. 1 may result in generation of light having an unpredictable, or "uncalibrated," color or color temperature. For example, consider a first lighting unit including a first uncalibrated red light source and a first uncalibrated blue light source, each controlled in response to a corresponding lighting command having an adjustable parameter in a range of from zero to 255 (0-255), wherein the maximum value of 255 represents the maximum radiant power available (i.e., 100%) from the light source. For purposes of this example, if the red command is set to zero and the blue command is non-zero, blue light is generated, whereas if the blue command is set to zero and the red command is non-zero, red light is generated. However, if both commands are varied from non-zero values, a variety of perceptibly different colors may be produced (e.g., in this example, at very least, many different shades of purple are possible). In particular, perhaps a particular desired color (e.g., lavender) is given by a red command having a value of 125 and a blue command having a value of 200. Now consider a second lighting unit including a second uncalibrated red light source substantially similar to the first uncalibrated red light source of the first lighting unit, and a second uncalibrated blue light source substantially similar to the first uncalibrated blue light source of the first lighting unit. As discussed above, even if both of the uncalibrated red light sources are controlled in response to respective identical commands, the actual intensity of light (e.g., radiant power in lumens) output by each red light source may be measurably different. Similarly, even if both of the uncalibrated blue light sources are controlled in response to respective identical commands, the actual light output by each blue light source may be measurably different.

With the foregoing in mind, it should be appreciated that if multiple uncalibrated light sources are used in combination in lighting units to produce a mixed colored light as discussed above, the observed color (or color temperature) of light produced by different lighting units under identical control conditions may be perceivably different. Specifically, consider again the "lavender" example above; the "first lavender" produced by the first lighting unit with a red command having a value of 125 and a blue command having a value of 200 indeed may be perceivably different than a "second lavender" produced by the second lighting unit with a red command having a value of 125 and a blue command having a value of 200. More generally, the first and second lighting units generate uncalibrated colors by virtue of their uncalibrated light sources. Accordingly, in some implementations of the present technology, the lighting unit 100 includes calibration means to facilitate the generation of light having a calibrated (e.g., predictable, reproducible) color at any given time. In one aspect, the calibration means is configured to adjust (e.g., scale) the light output of at least some light sources of the lighting unit so as to compensate for perceptible differences between similar light sources used in different lighting units. For example, in one embodiment, the processor 102 of the lighting unit 100 is configured to control one or more of the light sources so as to output radiation at a calibrated intensity that substantially corresponds in a predetermined manner to a control signal for the light source(s). As a result of mixing radiation having different spectra and respective calibrated intensities, a calibrated color is produced. In one aspect of this embodiment, at least one calibration value for each light source is stored in the memory 114, and the processor is programmed to apply the respective calibration values to the control signals (commands) for the corresponding light sources so as to generate the calibrated intensities. One or more calibration values may be determined once (e.g., during a lighting unit manufacturing/testing phase) and stored in the memory 114 for use by the processor 102. In another aspect, the processor 102 may be configured to derive one or more calibration values dynamically (e.g. from time to time) with the aid of one or more photosensors, for example. In various embodiments, the photosensor(s) may be one or more external components coupled to the lighting unit, or alternatively may be integrated as part of the lighting unit itself. A photosensor is one example of a signal source that may be integrated or otherwise associated with the lighting unit 100, and monitored by the processor 102 in connection with the operation of the lighting unit. Other examples of such signal sources are discussed further below, in connection with the signal source 124 shown in FIG. 1. One exemplary method that may be implemented by the processor 102 to derive one or more calibration values includes applying a reference control signal to a light source (e.g., corresponding to maximum output radiant power), and measuring (e.g., via one or more photosensors) an intensity of radiation (e.g., radiant power falling on the photosensor) thus generated by the light source. The processor may be programmed to then make a comparison of the measured intensity and at least one reference value (e.g., representing an intensity that nominally would be expected in response to the reference control signal). Based on such a comparison, the processor may determine one or more calibration values (e.g., scaling factors) for the light source. In particular, the processor may derive a calibration value such that, when applied to the reference control signal, the light source outputs radiation having an intensity that corresponds to the reference value (i.e., an "expected" intensity, e.g., expected radiant power in lumens). In various aspects, one calibration value may be derived for an entire range of control signal/output intensities for a given light source. Alternatively, multiple calibration values may be derived for a given light source (i.e., a number of calibration value "samples" may be obtained) that are respectively applied over different control signal/output intensity ranges, to approximate a nonlinear calibration function in a piecewise linear manner.

Still referring to FIG. 1, the lighting unit 100 optionally may include one or more user interfaces 118 that are provided to facilitate any of a number of user-selectable settings or functions (e.g., generally controlling the light output of the lighting unit 100, changing and/or selecting various pre-programmed lighting effects to be generated by the lighting unit, changing and/or selecting various parameters of selected lighting effects, setting particular identifiers such as addresses or serial numbers for the lighting unit, etc.). In various embodiments, the communication between the user interface 118 and the lighting unit may be accomplished through wire or cable, or wireless transmission.

In one implementation, the controller 105 of the lighting unit monitors the user interface 118 and controls one or more of the light sources 104A, 104B, 104C and 104D based at least in part on a user's operation of the interface. For example, the controller 105 may be configured to respond to operation of the user interface by originating one or more control signals for controlling one or more of the light sources. Alternatively, the processor 102 may be configured to respond by selecting one or more pre-programmed control signals stored in memory, modifying control signals generated by executing a lighting program, selecting and executing a new lighting program from memory, or otherwise affecting the radiation generated by one or more of the light sources.

In some embodiments, the user interface 118 may constitute one or more switches (e.g., a standard wall switch) that interrupt power to the controller 105. In one embodiment, the controller 105 is configured to monitor the power as controlled by the user interface, and in turn control one or more of the light sources based at least in part on duration of a power interruption caused by operation of the user interface. As discussed above, the controller may be particularly configured to respond to a predetermined duration of a power interruption by, for example, selecting one or more pre-programmed control signals stored in memory, modifying control signals generated by executing a lighting program, selecting and executing a new lighting program from memory, or otherwise affecting the radiation generated by one or more of the light sources.

FIG. 1 also illustrates that the lighting unit 100 may be configured to receive one or more signals 122 from one or more other signal sources 124. In one implementation, the controller 105 of the lighting unit may use the signal(s) 122, either alone or in combination with other control signals (e.g., signals generated by executing a lighting program, one or more outputs from a user interface, etc.), so as to control one or more of the light sources 104A, 104B, 104C and 104D in a manner similar to that discussed above in connection with the user interface.

Examples of the signal(s) 122 that may be received and processed by the controller 105 include, but are not limited to, one or more audio signals, video signals, power signals, various types of data signals, signals representing information obtained from a network (e.g., the Internet), signals representing one or more detectable/sensed conditions, signals from lighting units, signals consisting of modulated light, etc. In various implementations, the signal source(s) 124 may be located remotely from the lighting unit 100, or included as a component of the lighting unit. In one embodiment, a signal from one lighting unit 100 could be sent over a network to another lighting unit 100.

Some examples of a signal source 124 that may be employed in, or used in connection with, the lighting unit 100 of FIG. 1 include any of a variety of sensors or transducers that generate one or more signals 122 in response to some stimulus. Examples of such sensors include, but are not limited to, various types of environmental condition sensors, such as thermally sensitive (e.g., temperature, infrared) sensors, humidity sensors, motion sensors, photosensors/light sensors (e.g., photodiodes, sensors that are sensitive to one or more particular spectra of electromagnetic radiation such as spectroradiometers or spectrophotometers, etc.), various types of cameras, sound or vibration sensors or other pressure/force transducers (e.g., microphones, piezoelectric devices), and the like.

Additional examples of a signal source 124 include various metering/detection devices that monitor electrical signals or characteristics (e.g., voltage, current, power, resistance, capacitance, inductance, etc.) or chemical/biological characteristics (e.g., acidity, a presence of one or more particular chemical or biological agents, bacteria, etc.) and provide one or more signals 122 based on measured values of the signals or characteristics. Yet other examples of a signal source 124 include various types of scanners, image recognition systems, voice or other sound recognition systems, artificial intelligence and robotics systems, and the like. A signal source 124 could also be a lighting unit 100, another controller or processor, or any one of many available signal generating devices, such as media players, MP3 players, computers, DVD players, CD players, television signal sources, camera signal sources, microphones, speakers, telephones, cellular phones, instant messenger devices, SMS devices, wireless devices, personal organizer devices, and many others.

The lighting unit 100 shown in FIG. 1 also may include one or more optical elements or facilities 130 to optically process the radiation generated by the light sources 104A, 104B, 104C, and 104D. For example, one or more optical elements may be configured so as to change one or both of a spatial distribution and a propagation direction of the generated radiation. In particular, one or more optical elements may be configured to change a diffusion angle of the generated radiation. In one aspect of this embodiment, one or more optical elements 130 may be particularly configured to variably change one or both of a spatial distribution and a propagation direction of the generated radiation (e.g., in response to some electrical and/or mechanical stimulus). Examples of optical elements that may be included in the lighting unit 100 include, but are not limited to, reflective materials, refractive materials, translucent materials, filters, lenses, mirrors, and fiber optics. The optical element 130 also may include a phosphorescent material, luminescent material, or other material capable of responding to or interacting with the generated radiation.

As also shown in FIG. 1, the lighting unit 100 may include one or more communication ports 120 to facilitate coupling of the lighting unit 100 to any of a variety of other devices, including one or more other lighting units. For example, one or more communication ports 120 may facilitate coupling multiple lighting units together as a networked lighting system, in which at least some or all of the lighting units are addressable (e.g., have particular identifiers or addresses) and/or are responsive to particular data transported across the network. In another aspect, one or more communication ports 120 may be adapted to receive and/or transmit data through wired or wireless transmission. In one embodiment, information received through the communication port may at least in part relate to address information to be subsequently used by the lighting unit, and the lighting unit may be adapted to receive and then store the address information in the memory 114 (e.g., the lighting unit may be adapted to use the stored address as its address for use when receiving subsequent data via one or more communication ports).

In particular, in a networked lighting system environment, as discussed in greater detail further below (e.g., in connection with FIG. 2), as data is communicated via the network, the controller 105 of each lighting unit coupled to the network may be configured to be responsive to particular data (e.g., lighting control commands) that pertain to it (e.g., in some cases, as dictated by the respective identifiers of the networked lighting units). Once a given controller identifies particular data intended for it, it may read the data and, for example, change the lighting conditions produced by its light sources according to the received data (e.g., by generating appropriate control signals to the light sources). In one aspect, the memory 114 of each lighting unit coupled to the network may be loaded, for example, with a table of lighting control signals that correspond with data the processor 102 of the controller receives. Once the processor 102 receives data from the network, the processor may consult the table to select the control signals that correspond to the received data, and control the light sources of the lighting unit accordingly (e.g., using any one of a variety of analog or digital signal control techniques, including various pulse modulation techniques discussed above).

In one aspect of this embodiment, the processor 102 of a given lighting unit, whether or not coupled to a network, may be configured to interpret lighting instructions/data that are received in a DMX protocol (as discussed, for example, in U.S. Pat. Nos. 6,016,038 and 6,211,626), which is a lighting command protocol conventionally employed in the lighting industry for some programmable lighting applications. In the DMX protocol, lighting instructions are transmitted to a lighting unit as control data that is formatted into packets including 512 bytes of data, in which each data byte is constituted by 8-bits representing a digital value of between zero and 255. These 512 data bytes are preceded by a "start code" byte. An entire "packet" including 513 bytes (start code plus data) is transmitted serially at 250 kbit/s pursuant to RS-485 voltage levels and cabling practices, wherein the start of a packet is signified by a break of at least 88 microseconds.

In the DMX protocol, each data byte of the 512 bytes in a given packet is intended as a lighting command for a particular "channel" of a multi-channel lighting unit, wherein a digital value of zero indicates no radiant output power for a given channel of the lighting unit (i.e., channel off), and a digital value of 255 indicates full radiant output power (100% available power) for the given channel of the lighting unit (i.e., channel full on). For example, in one aspect, considering for the moment a three-channel lighting unit based on red, green and blue LEDs (i.e., an "R-G-B" lighting unit), a lighting command in DMX protocol may specify each of a red channel command, a green channel command, and a blue channel command as eight-bit data (i.e., a data byte) representing a value from 0 to 255. The maximum value of 255 for any one of the color channels instructs the processor 102 to control the corresponding light source(s) to operate at maximum available power (i.e., 100%) for the channel, thereby generating the maximum available radiant power for that color (such a command structure for an R-G-B lighting unit commonly is referred to as 24-bit color control). Hence, a command of the format [R, G, B]=[255, 255, 255] would cause the lighting unit to generate maximum radiant power for each of red, green and blue light (thereby creating white light).

Thus, a given communication link employing the DMX protocol conventionally can support up to 512 different lighting unit channels. A given lighting unit designed to receive communications formatted in the DMX protocol generally is configured to respond to only one or more particular data bytes of the 512 bytes in the packet corresponding to the number of channels of the lighting unit (e.g., in the example of a three-channel lighting unit, three bytes are used by the lighting unit), and ignore the other bytes, based on a particular position of the desired data byte(s) in the overall sequence of the 512 data bytes in the packet. To this end, DMX-based lighting units may be equipped with an address selection mechanism that may be manually set by a user/installer to determine the particular position of the data byte(s) that the lighting unit responds to in a given DMX packet.

It should be appreciated, however, that lighting units suitable for purposes of the present disclosure are not limited to a DMX command format, as lighting units according to various embodiments may be configured to be responsive to other types of communication protocols/lighting command formats so as to control their respective light sources. In general, the processor 102 may be configured to respond to lighting commands in a variety of formats that express prescribed operating powers for each different channel of a multi-channel lighting unit according to some scale representing zero to maximum available operating power for each channel.

For example, in another embodiment, the processor 102 of a given lighting unit may be configured to interpret lighting instructions/data that are received in a conventional Ethernet protocol (or similar protocol based on Ethernet concepts). Ethernet is a well-known computer networking technology often employed for local area networks (LANs) that defines wiring and signaling requirements for interconnected devices forming the network, as well as frame formats and protocols for data transmitted over the network. Devices coupled to the network have respective unique addresses, and data for one or more addressable devices on the network is organized as packets. Each Ethernet packet includes a "header" that specifies a destination address (to where the packet is going) and a source address (from where the packet came), followed by a "payload" including several bytes of data (e.g., in Type II Ethernet frame protocol, the payload may be from 46 data bytes to 1500 data bytes). A packet concludes with an error correction code or "checksum." As with the DMX protocol discussed above, the payload of successive Ethernet packets destined for a given lighting unit configured to receive communications in an Ethernet protocol may include information that represents respective prescribed radiant powers for different available spectra of light (e.g., different color channels) capable of being generated by the lighting unit.

In yet another embodiment, the processor 102 of a given lighting unit may be configured to interpret lighting instructions/data that are received in a serial-based communication protocol as described, for example, in U.S. Pat. No. 6,777, 891. In particular, according to one embodiment based on a serial-based communication protocol, multiple lighting units 100 are coupled together via their communication ports 120 to form a series connection of lighting units (e.g., a daisy-chain or ring topology), wherein each lighting unit has an input communication port and an output communication port. Lighting instructions/data transmitted to the lighting units are arranged sequentially based on a relative position in the series connection of each lighting unit. It should be appreciated that while a lighting network based on a series interconnection of lighting units is discussed particularly in connection with an embodiment employing a serial-based communication protocol, the disclosure is not limited in this respect, as other examples of lighting network topologies contemplated by the present disclosure are discussed further below in connection with FIG. 3.

In one embodiment employing a serial-based communication protocol, as the processor 102 of each lighting unit in the series connection receives data, it "strips off" or extracts one or more initial portions of the data sequence intended for it and transmits the remainder of the data sequence to the next lighting unit in the series connection. For example, again considering a serial interconnection of multiple three-channel (e.g., "R-G-B") lighting units, three multi-bit values (one multi-bit value per channel) are extracted by each three-channel lighting unit from the received data sequence. Each lighting unit in the series connection in turn repeats this procedure, namely, stripping off or extracting one or more initial portions (multi-bit values) of a received data sequence and transmitting the remainder of the sequence. The initial portion of a data sequence stripped off in turn by each lighting unit may include respective prescribed radiant powers for different available spectra of light (e.g., different color channels) capable of being generated by the lighting unit. As discussed above in connection with the DMX protocol, in various implementations each multi-bit value per channel may be an 8-bit value, or other number of bits (e.g., 12, 16, 24, etc.) per channel, depending in part on a desired control resolution for each channel.

In yet another exemplary implementation of a serial-based communication protocol, rather than stripping off an initial portion of a received data sequence, a flag is associated with each portion of a data sequence representing data for multiple channels of a given lighting unit, and an entire data sequence for multiple lighting units is transmitted completely from lighting unit to lighting unit in the serial connection. As a lighting unit in the serial connection receives the data sequence, it looks for the first portion of the data sequence in which the flag indicates that a given portion (representing one or more channels) has not yet been read by any lighting unit. Upon finding such a portion, the lighting unit reads and processes the portion to provide a corresponding light output, and sets the corresponding flag to indicate that the portion has been read. Again, the entire data sequence is transmitted completely from lighting unit to lighting unit, wherein the state of the flags indicate the next portion of the data sequence available for reading and processing.

In one embodiment relating to a serial-based communication protocol, the controller 105 a given lighting unit configured for a serial-based communication protocol may be implemented as an application-specific integrated circuit (ASIC) designed to specifically process a received stream of lighting instructions/data according to the "data stripping/ extraction" process or "flag modification" process discussed above. More specifically, in one exemplary embodiment of multiple lighting units coupled together in a series interconnection to form a network, each lighting unit includes an ASIC-implemented controller 105 having the functionality of the processor 102, the memory 114 and communication port(s) 120 shown in FIG. 1 (optional user interface 118 and signal source 124 of course need not be included in some implementations). Such an implementation is discussed in detail in U.S. Pat. No. 6,777,891.

In one embodiment, the lighting unit 100 of FIG. 1 may include and/or be coupled to one or more power sources 108. In various aspects, examples of power source(s) 108 include, but are not limited to, AC power sources, DC power sources, batteries, solar-based power sources, thermoelectric or mechanical-based power sources and the like. Additionally, in one aspect, the power source(s) 108 may include or be associated with one or more power conversion devices or power conversion circuitry (e.g., in some cases internal to the lighting unit 100) that convert power received by an external power source to a form suitable for operation of the various internal circuit components and light sources of the lighting unit 100. In one exemplary implementation discussed in U.S. application Ser. Nos. 11/079,904 and 11,429,715, the controller 105 of the lighting unit 100 may be configured to accept a standard A.C. line voltage from the power source 108 and provide appropriate D.C. operating power for the light sources and other circuitry of the lighting unit based on concepts related to DC-DC conversion, or "switching" power supply concepts. In one aspect of such implementations, the controller 105 may include circuitry to not only accept a standard A.C. line voltage but to ensure that power is drawn from the line voltage with a significantly high power factor.

While not shown explicitly in FIG. 1, the lighting unit 100 may be implemented in any one of several different structural configurations according to various embodiments of the present disclosure. Examples of such configurations include, but are not limited to, an essentially linear or curvilinear configuration, a circular configuration, an oval configuration, a rectangular configuration, combinations of the foregoing, various other geometrically shaped configurations, various two or three dimensional configurations, and the like.

Figure 2:
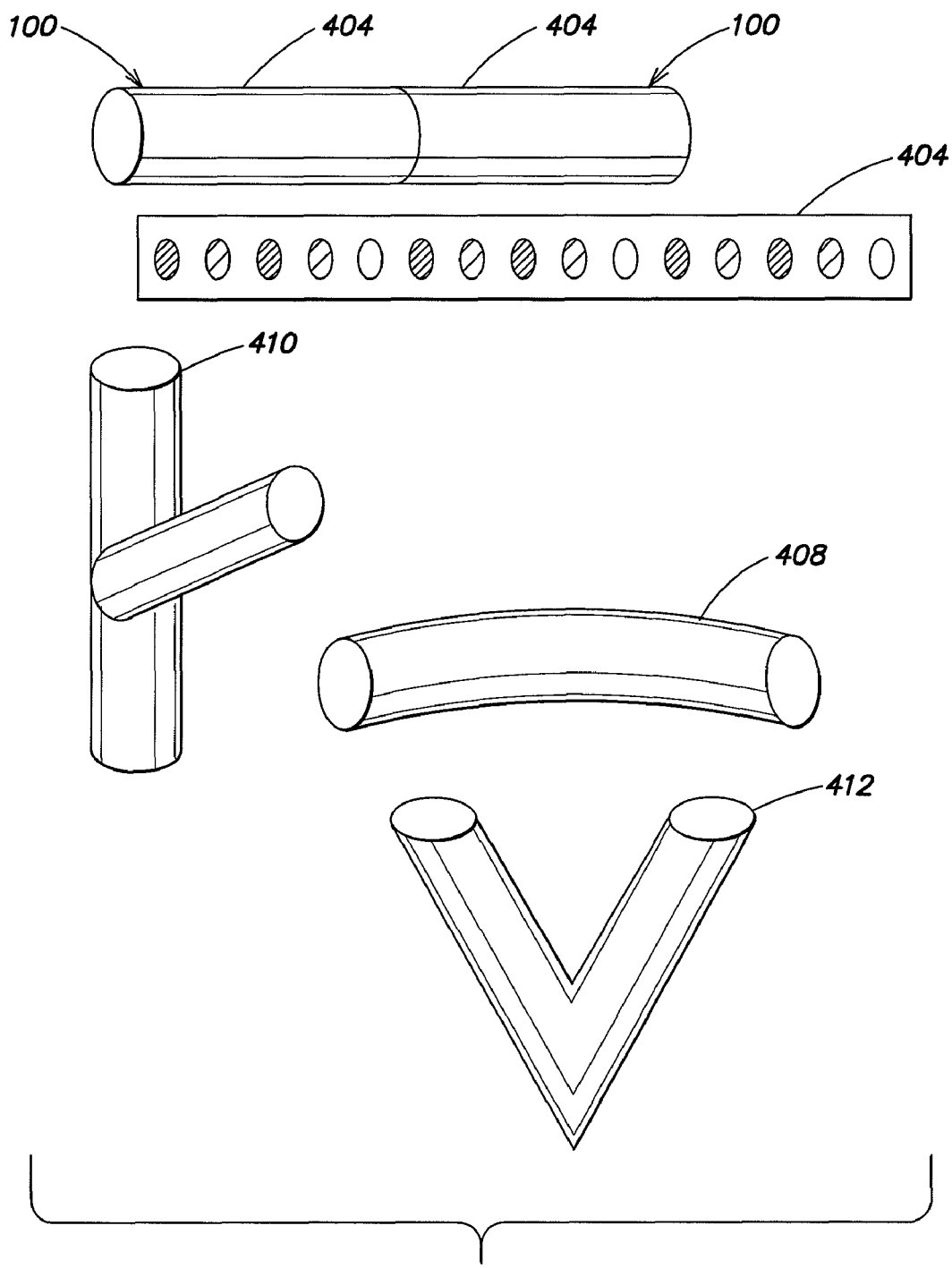
FIG. 2 illustrates exemplary form-factors for the lighting unit of FIG. 1, based on a substantially linear configuration or curvilinear configuration, according to various embodiments of the invention.

FIG. 2 illustrates exemplary form-factors for the lighting unit 100 based on a substantially linear configuration 404 or curvilinear configuration 408, according to one embodiment. In particular, an essentially linear or elongate housing may include the one or more light sources 104A-104D, as well as the controller 105 and other components discussed above in connection with FIG. 1. In one aspect, the light sources 104A-104D may be disposed in a substantially linear manner on one or more circuit boards within the housing. Such a lighting unit having a linear configuration 404 or curvilinear configuration 408 can be placed end-to-end with other linear or curvilinear lighting units, or lighting units having other shapes, to produce longer linear lighting systems comprised of multiple lighting units 100 in various shapes. In yet other implementations, housings including integral junctions can be created with branches, "Ts," or "Ys" to create a lighting unit having a branched configuration 410, and lighting units also may be implemented with a bent configuration 412 that includes one or more "V" elements. Combinations of various configurations including linear configurations 404, curvilinear configurations 408, branched configurations 410 and bent configurations 412 can be used to create virtually any shape of lighting system, such as one shaped to resemble a letter, number, symbol, logo, object, structure, or the like.

A given lighting unit also may have any one of a variety of mounting arrangements for the light source(s), enclosure/housing arrangements and shapes to partially or fully enclose the light sources, and/or electrical and mechanical connection configurations. Additionally, one or more optical elements as discussed above may be partially or fully integrated with an enclosure/housing arrangement for the lighting unit. Furthermore, the various components of the lighting unit discussed above (e.g., processor, memory, power, user interface, etc.), as well as other components that may be associated with the lighting unit in different implementations (e.g., sensors/transducers, other components to facilitate communication to and from the unit, etc.) may be packaged in a variety of ways; for example, in one aspect, any subset or all of the various lighting unit components, as well as other components that may be associated with the lighting unit, may be packaged together. In another aspect, packaged subsets of components may be coupled together electrically and/or mechanically in a variety of manners.

Figure 3:
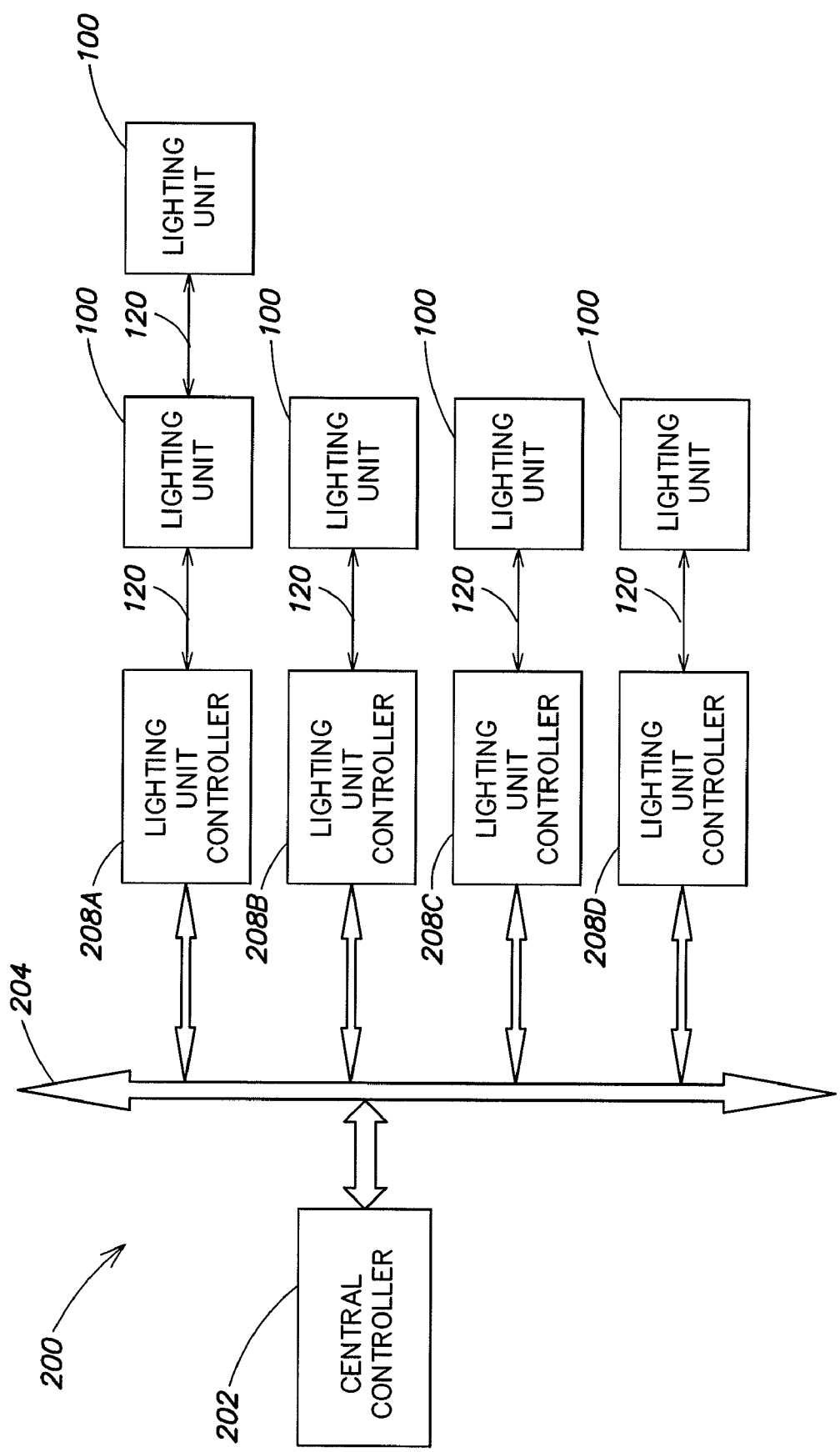
FIG. 3 is a diagram illustrating a networked lighting system according to one embodiment of the invention.

FIG. 3 illustrates an example of a networked lighting system 200 according to one embodiment of the present disclosure. In the embodiment of FIG. 3, a number of lighting units 100, similar to those discussed above in connection with FIG. 1, are coupled together to form the networked lighting system. It should be appreciated, however, that the particular configuration and arrangement of lighting units shown in FIG. 3 is for purposes of illustration only, and that the disclosure is not limited to the particular system topology shown in FIG. 3.

Additionally, while not shown explicitly in FIG. 3, it should be appreciated that the networked lighting system 200 may be configured flexibly to include one or more user interfaces, as well as one or more signal sources such as sensors/transducers. For example, one or more user interfaces and/or one or more signal sources such as sensors/transducers (as discussed above in connection with FIG. 1) may be associated with any one or more of the lighting units of the networked lighting system 200. Alternatively (or in addition to the foregoing), one or more user interfaces and/or one or more signal sources may be implemented as "stand alone" components in the networked lighting system 200. Whether stand alone components or particularly associated with one or more lighting units 100, these devices may be "shared" by the lighting units of the networked lighting system. Stated differently, one or more user interfaces and/or one or more signal sources such as sensors/transducers may constitute "shared resources" in the networked lighting system that may be used in connection with controlling any one or more of the lighting units of the system.

As shown in the embodiment of FIG. 3, the lighting system 200 may include one or more lighting unit controllers (hereinafter "LUCs") 208A, 208B, 208C, and 208D, wherein each LUC is responsible for communicating with and generally controlling one or more lighting units 100 coupled to it. Although FIG. 3 illustrates two lighting units 100 coupled to the LUC 208A, and one lighting unit 100 coupled to each LUC 208B, 208C and 208D, it should be appreciated that the disclosure is not limited in this respect, as different numbers of lighting units 100 may be coupled to a given LUC in a variety of different configurations (serially connections, parallel connections, combinations of serial and parallel connections, etc.) using a variety of different communication media and protocols.

In the system of FIG. 3, each LUC in turn may be coupled to a central controller 202 that is configured to communicate with one or more LUCs. Although FIG. 3 shows four LUCs coupled to the central controller 202 via a generic connection 204 (which may include any number of a variety of conventional coupling, switching and/or networking devices), it should be appreciated that according to various embodiments, different numbers of LUCs may be coupled to the central controller 202. Additionally, according to various embodiments of the present disclosure, the LUCs and the central controller may be coupled together in a variety of configurations using a variety of different communication media and protocols to form the networked lighting system 200. Moreover, it should be appreciated that the interconnection of LUCs and the central controller, and the interconnection of lighting units to respective LUCs, may be accomplished in different manners (e.g., using different configurations, communication media, and protocols).

For example, according to one embodiment of the present invention, the central controller 202 shown in FIG. 3 may by configured to implement Ethernet-based communications with the LUCs, and in turn the LUCs may be configured to implement one of Ethernet-based, DMX-based, or serial-based protocol communications with the lighting units 100 (as discussed above, exemplary serial-based protocols suitable for various network implementation are discussed in detail in U.S. Pat. No. 6,777,891. In particular, in one version of this embodiment, each LUC may be configured as an addressable Ethernet-based controller and accordingly may be identifiable to the central controller 202 via a particular unique address (or a unique group of addresses and/or other identifiers) using an Ethernet-based protocol. In this manner, the central controller 202 may be configured to support Ethernet communications throughout the network of coupled LUCs, and each LUC may respond to those communications intended for it. In turn, each LUC may communicate lighting control information to one or more lighting units coupled to it, for example, via an Ethernet, DMX, or serial-based protocol, in response to the Ethernet communications with the central controller 202 (wherein the lighting units are appropriately configured to interpret information received from the LUC in the Ethernet, DMX, or serial-based protocols).

The LUCs 208A, 208B, and 208C shown in FIG. 3 may be configured to be "intelligent" in that the central controller 202 may be configured to communicate higher level commands to the LUCs that need to be interpreted by the LUCs before lighting control information can be forwarded to the lighting units 100. For example, a lighting system operator may want to generate a color changing effect that varies colors from lighting unit to lighting unit in such a way as to generate the appearance of a propagating rainbow of colors ("rainbow chase"), given a particular placement of lighting units with respect to one another. In this example, the operator may provide a simple instruction to the central controller 202 to accomplish this, and in turn the central controller may communicate to one or more LUCs using an Ethernet-based protocol high level command to generate a "rainbow chase." The command may contain timing, intensity, hue, saturation or other relevant information, for example. When a given LUC receives such a command, it may then interpret the command and communicate further commands to one or more lighting units using any one of a variety of protocols (e.g., Ethernet, DMX, serial-based), in response to which the respective sources of the lighting units are controlled via any of a variety of signaling techniques (e.g., PWM).

One or more LUCs of a lighting network may be coupled to a series connection of multiple lighting units 100 (e.g., see LUC 208A of FIG. 3, which is coupled to two series-connected lighting units 100). For example, each LUC coupled in this manner can be configured to communicate with the multiple lighting units using a serial-based communication protocol, examples of which were discussed above. More specifically, in one exemplary implementation, a given LUC may be configured to communicate with a central controller 202, and/or one or more other LUCs, using an Ethernet-based protocol, and in turn communicate with the multiple lighting units using a serial-based communication protocol. In this manner, a LUC may be viewed in one sense as a protocol converter that receives lighting instructions or data in the Ethernet-based protocol, and passes on the instructions to multiple serially-connected lighting units using the serial-based protocol. Of course, in other network implementations involving DMX-based lighting units arranged in a variety of possible topologies, it should be appreciated that a given LUC similarly may be viewed as a protocol converter that receives lighting instructions or data in the Ethernet protocol, and passes on instructions formatted in a DMX protocol. It should again be appreciated that the foregoing example of using multiple different communication implementations (e.g., Ethernet/DMX) in a lighting system according to one embodiment of the present technology is for purposes of illustration only, and that the technology is not limited to this particular example.

From the foregoing, it may be appreciated that one or more lighting units as discussed above are capable of generating highly controllable variable color light over a wide range of colors, as well as variable color temperature white light over a wide range of color temperatures.

Figure 4:
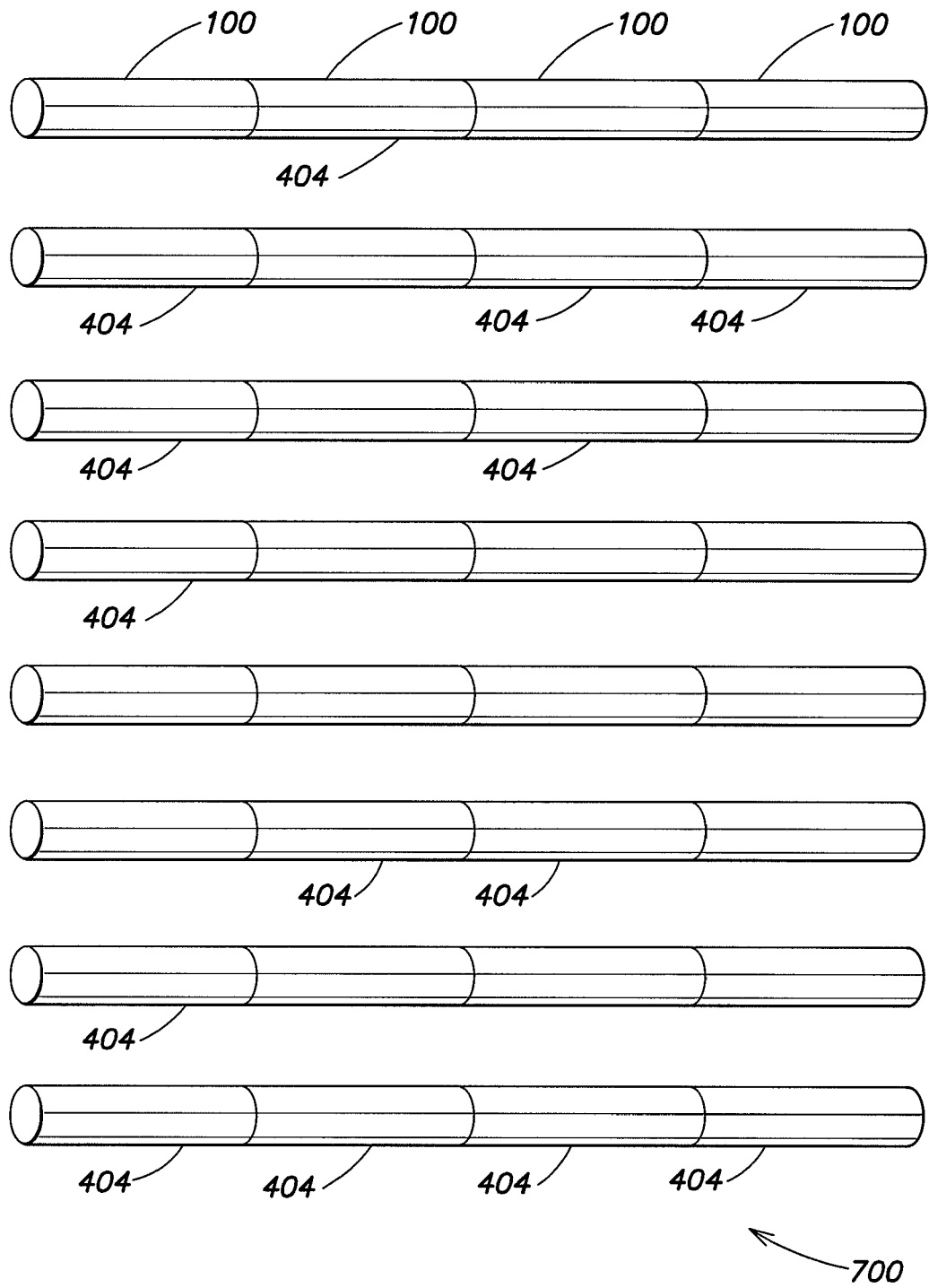
FIG. 4 is a diagram illustrating a network of lighting units each having a linear configuration and disposed in a two-dimensional array, according to one embodiment of the invention.
Figure 5:
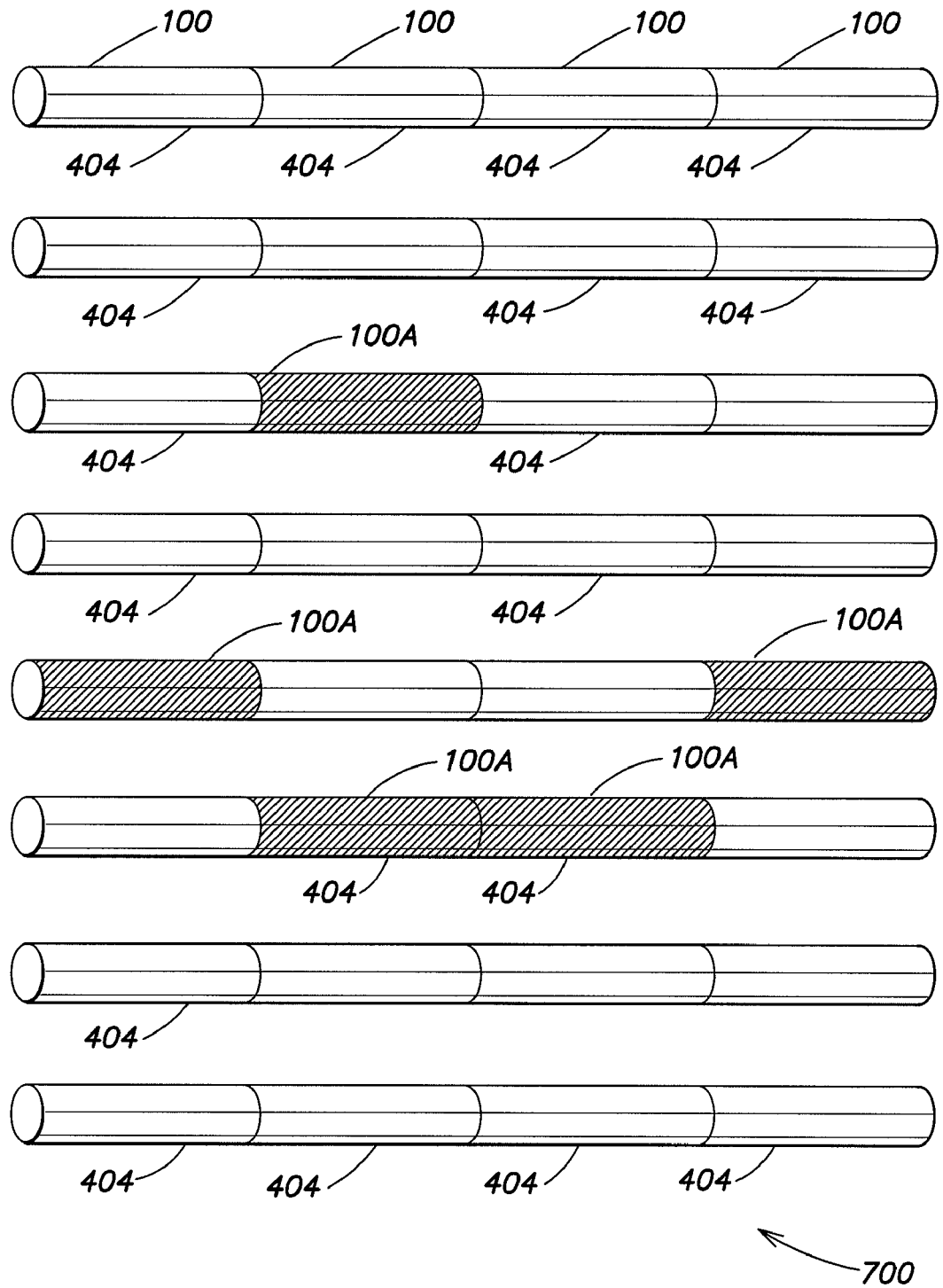
FIG. 5 shows the array of FIG. 4, with certain lighting units being indicated as turned on or generating light, according to one embodiment of the invention.

FIG. 4 shows a network of lighting units 100 having a linear configuration 404 (as discussed above in connection with FIG. 2) disposed in a two-dimensional array 700. The lighting units 100 may be electrically interconnected to form the networked array shown in FIG. 4 in any of a variety of manners, as discussed above in connection with FIG. 3. As illustrated in FIG. 4, lighting units having the linear configuration 404 can be physically disposed end-to-end to create an array of arbitrarily large size. Lighting units having the linear configuration 404 can be of various sizes, such as one foot and four foot segments, or can be uniform in size. Each linear lighting unit 100 can be individually controlled as discussed above (via a central controller 202 and an appropriate addressing scheme/communication protocol) to provide color, hue, intensity, saturation, and color temperature changes. Thus, the array 700 can present any combination of colors, based on the on and off state, color and intensity of individual linear lighting units of the array 700. For example, FIG. 5 shows the array 700 of linear lighting units 100 having the linear configuration 404, with certain units 100A turned on (i.e., generating perceivable light output). The units 100A that are turned on can show the same color, or different colors, under control of a central controller 202 shown in FIG. 3, for example.

Figure 6:
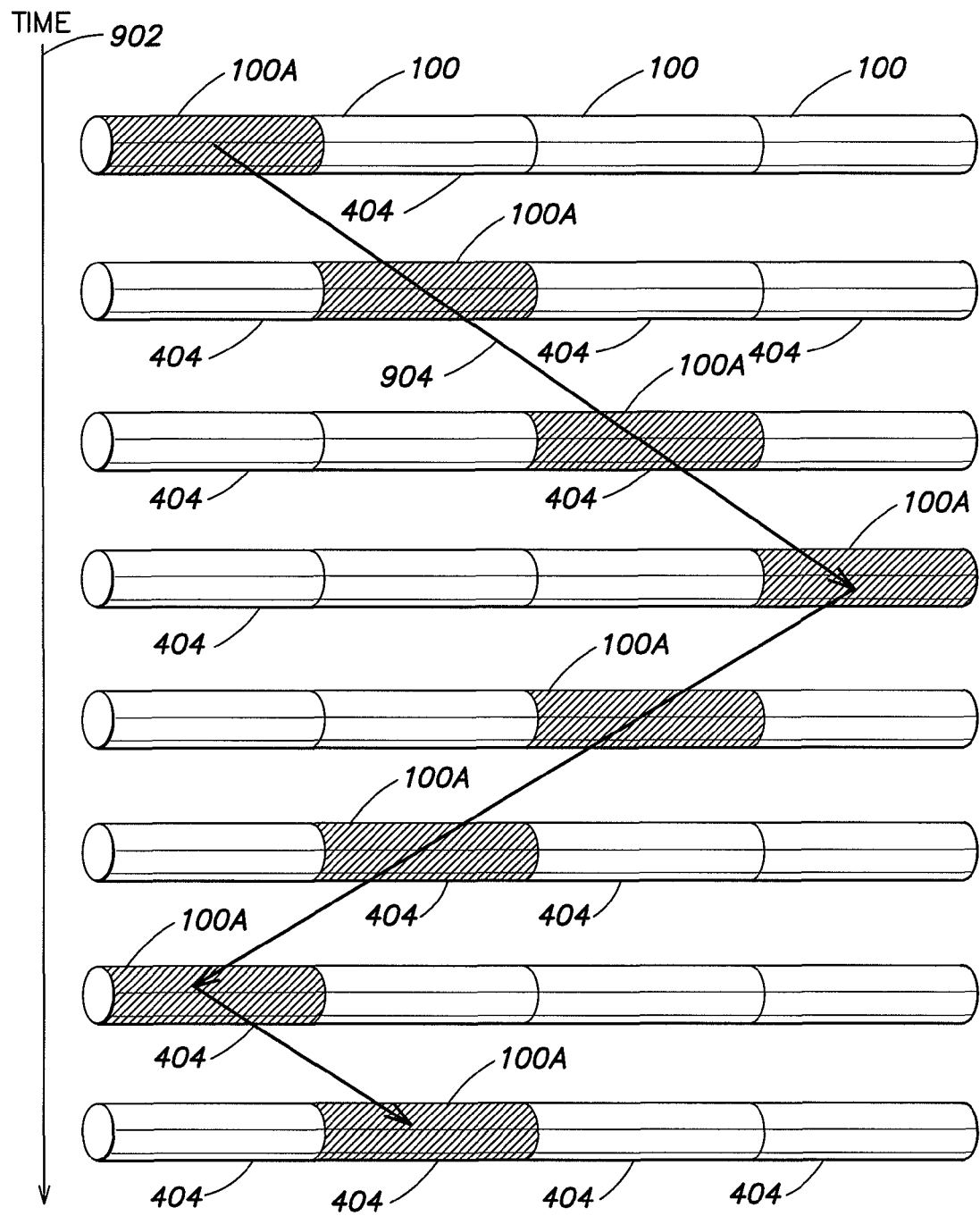
FIG. 6 illustrates a timing diagram for the entire array shown in FIGS. 4 and 5, or one row of the array, demonstrating that any one of a variety of lighting effects can be created by controlling different lighting units of the array to generate various light outputs over time, according to one embodiment of the invention.

FIG. 6 illustrates a timing diagram for the array 700 of FIGS. 4 and 5, and shows that any one of a variety of lighting effects can be created by controlling different lighting units of the array to generate various light outputs over time. The arrow 902 in FIG. 6 shows that as time passes (moving downward in FIG. 6), different lighting units 100A of the array 700 are triggered to turn on. In one aspect, the progression of lighting units 100A turning on over time could represent a "moving element" of the array 700, which travels down and across the array and back, apparently following the path of the arrow 904.

Alternatively, rather than representing an entire two-dimensional array containing multiple rows of linear lighting units, the timing diagram of FIG. 6 can represent a single line of linear lighting units, in which each row illustrated in FIG. 6 represents the same row at a different instant of time. Thus, with the passage of each period of time, the energized lighting unit 100A in the row travels to the right, then back to the left. As a result, a particular color of light can "bounce" back and forth between the ends of a row of linear lighting units, or it can "bounce" around the "walls" of an array (between the ends of a given row). The energized lighting unit can be given attributes, such as simple harmonic motion, a pendulum effect, or the like. With a proper algorithm, the "bounce" can be made to obey rules that appear to give it "friction" or "gravity," (causing the bounce effect to slow down) or "anti-gravity" (causing the bounce effect to accelerate). In yet another example of a lighting effect, multiple lighting units of a given row can also be energized so as to "follow" each other, so that a color chases other colors along the line, or through the array, in a "color chasing rainbow" effect.

Any of the foregoing lighting effects and many others can be similarly implemented with other combinations of lighting unit configurations, such as a curvilinear configuration 408, branched configuration 410, or bent configuration 412, as discussed above in connection with FIG. 2. It should be noted that any shape or configuration for a lighting unit 100 may substantially resemble a point source if viewed from a great enough distance. For example, individual substantially linear lighting units of a larger assembly/array/arrangement, or lighting units having other geometric configurations, can appear like "pixels" on the side of a building, if viewed from a great enough distance.

FIGS. 7, 8A, 8B and 8C illustrate various structural aspects of one embodiment of the present disclosure directed to a modular essentially linear lighting fixture 600 that is configured to house multiple lighting units 100 similar to those discussed above in connection with FIGS. 1-6. In various aspects of this embodiment, the lighting fixture 600 may include a housing that includes multiple portions, e.g., a first portion 610 comprising an extruded aluminum portion, over which is disposed a second portion including a substantially linear cylindrical optics casing. The first portion 610 forms an enclosure containing one or more circuit boards on which various power-related and network-related circuitry are implemented. As discussed in greater detail below, in one exemplary implementation, one or more circuit boards on which are disposed multiple lighting units 100 may be located within the second portion 620 formed by the optics casing, separated from other power-related and network-related components disposed in the first portion 610.

As indicated in FIG. 8 and in Table 1 below, a number of different size configurations are contemplated for the modular lighting fixture 600, with larger size configurations accommodating greater numbers of lighting units, as discussed further below. For example, Table 1 below provides three exemplary fixture sizes (in length), namely 18 inches, 48 inches, and 96 inches, and provides various exemplary indicated dimensions for the respective fixture sizes. While three possible fixture sizes are indicated in Table 1, it should be appreciated that lighting fixtures 600 according to the present invention are not necessarily limited in this respect, as the dimensions indicated in FIG. 8 are provided primarily for purposes of illustration, and other dimensions are possible.

housing such that two or more lighting fixtures 600 can be connected end-to-end without a gap between the second portions 620 of their housings, and, therefore, without visual interruption of the perceived light emission from the adjoined fixtures.

Various functional aspects of these components are discussed in turn below.

Figure 9:
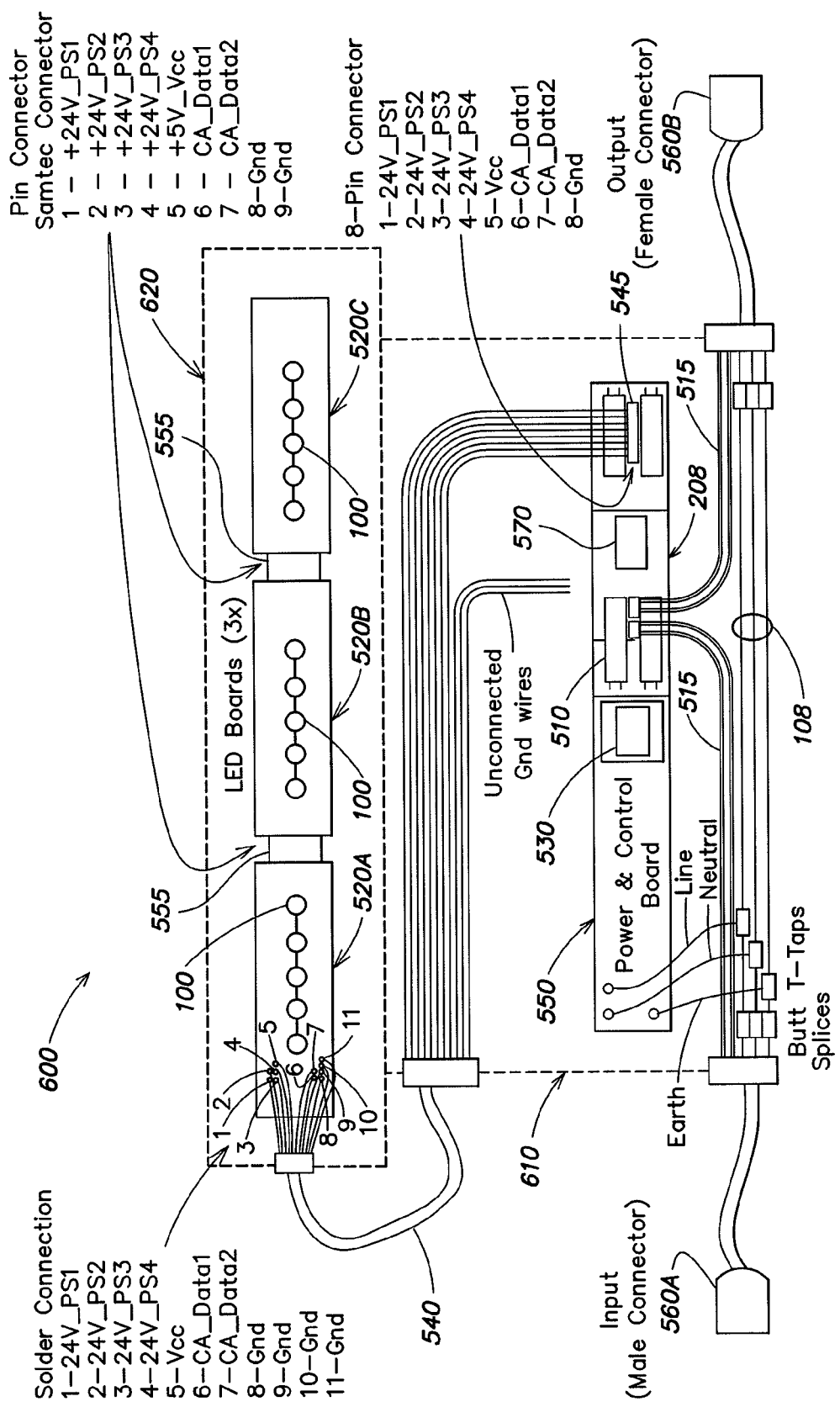
FIG. 9 illustrates an exemplary arrangement of various components of the linear lighting fixture of FIGS. 7 and 8, according to one embodiment of the present invention.
Figure 10A:
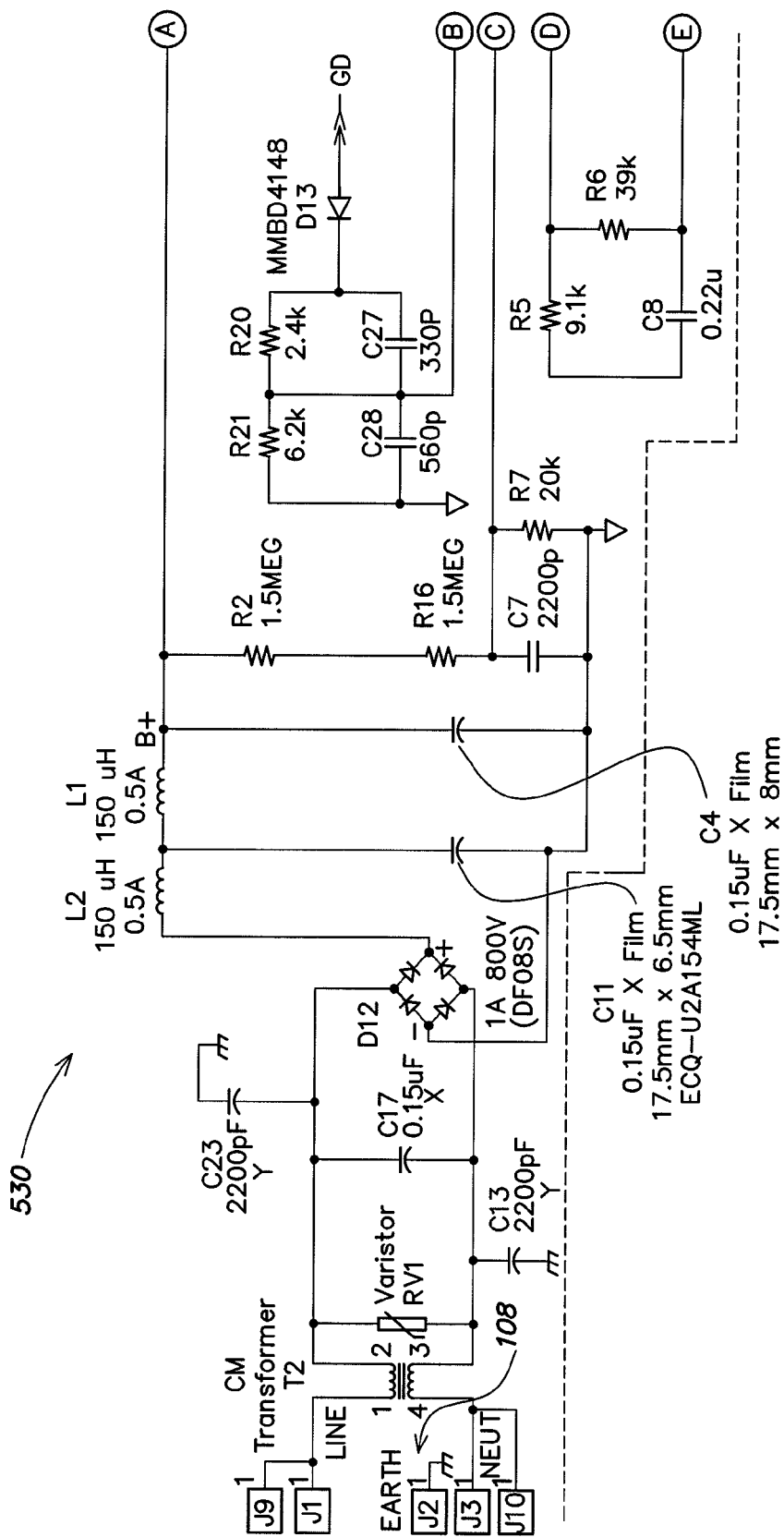
FIG. 10 illustrates a circuit diagram of a switching power supply of the lighting fixture of FIG. 9, according to one embodiment of the invention.
Figure 10B:
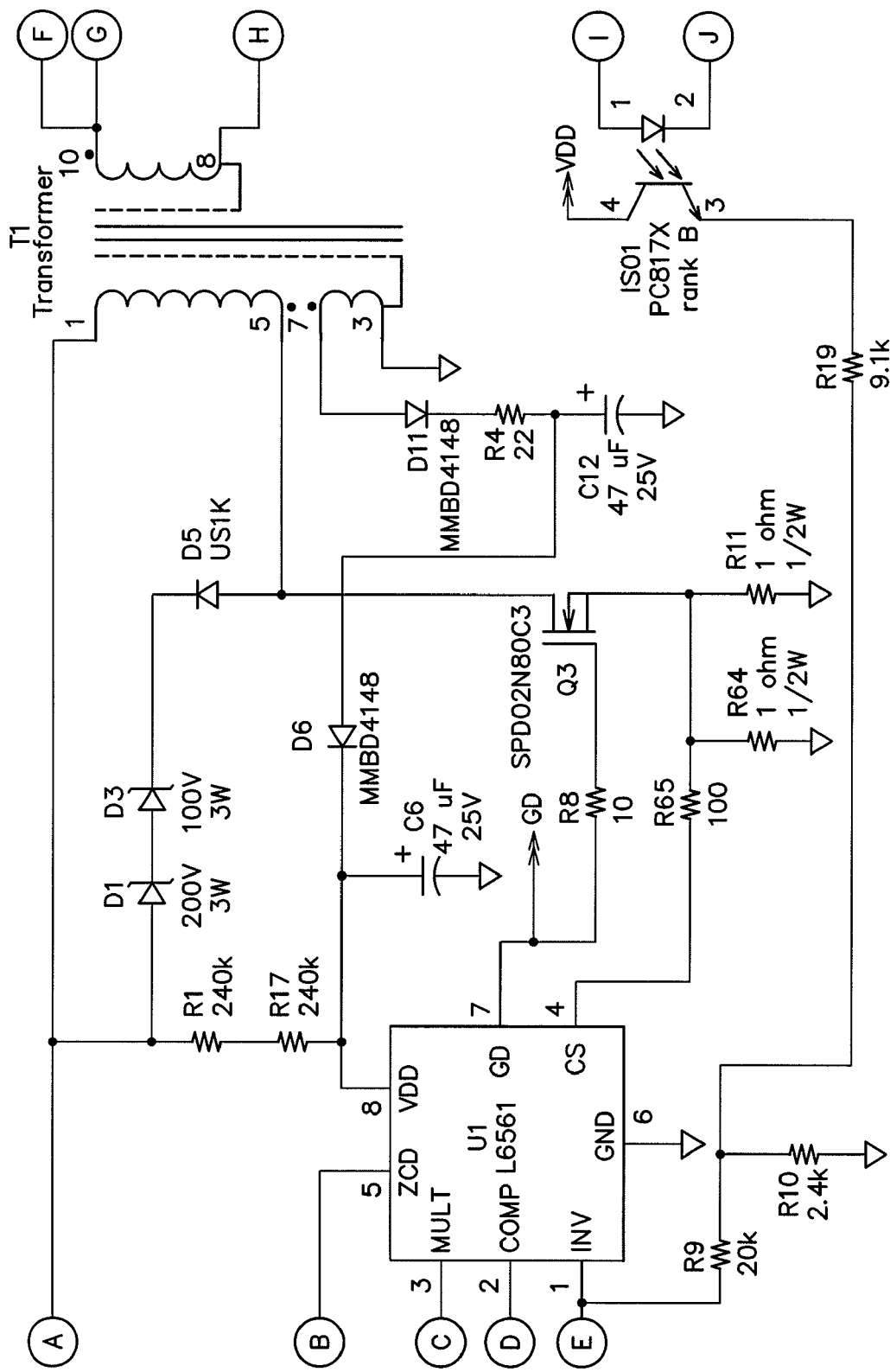
Figure 10C:
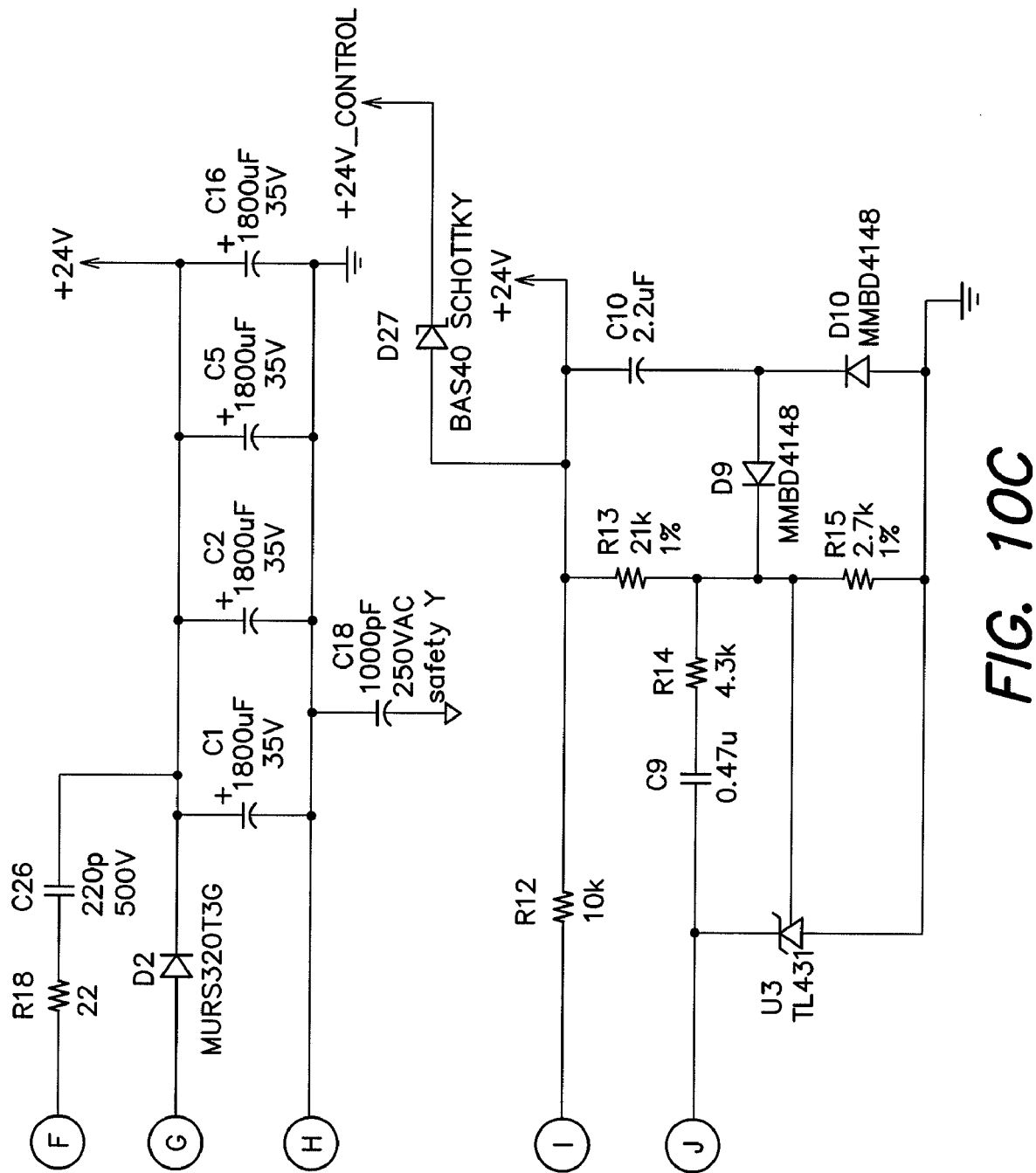

In one version of the embodiment shown in FIG. 9, the lighting fixture 600 is configured to receive a source of operating power 108 via the input connector 560A in the form of a standard/conventional A.C. line voltage (e.g., 120 Vrms-240 Vrms). This A.C. line voltage also is connected directly to the output connector 560B for provision to one or more other lighting fixtures in turn that may be coupled in a daisy-chain fashion to the lighting fixture 600. Internal to the lighting fixture 600, the A.C. line voltage is connected to the power and control circuit board 550, which includes a power factor corrected switching power supply 530 (e.g., based on a DC-DC converter) that provides a D.C. output voltage to various network-related circuitry as well as the multiple lighting units 100 of the fixture 600. The switching power supply 530 may be configured to provide a D.C. output voltage on the order of approximately 20 Volts (e.g., 24 VDC) and capable of providing approximately 20 Watts of power. A circuit diagram of a switching power supply 530 according to one exemplary implementation is shown in FIG. 10.

In another version of the embodiment shown in FIG. 9, the lighting fixture 600 is configured to receive lighting instructions/data for the multiple lighting units of the fixture using an Ethernet-based protocol. To this end, both the input connector 560A and the output connector 560B are coupled to transmit and receive twisted wire pairs 515 to carry Ethernet-based communications to and from the power and control board 550 of the lighting fixture 600. More specifically, the wire pairs 515 carrying the Ethernet-based communications are coupled to a lighting unit controller or LUC 208, similar to that dis-

TABLE 1

| Fixture Size (in/cm) | A (in/cm) | B (in/cm) | C (in/cm) | D (in/cm) | #Fastening Locations Per Fixture | Weight (lb/kg) |
|---|---|---|---|---|---|---|
| 18/45.72 | 0.13/0.33 | 3.63/9.22 | 10.88/27.64 | 12.38/31.45 | 6 | 3.4/1.5 |
| 48/121.92 | 0.38/0.97 | 8.06/20.47 | 16.13/40.97 | 42.38/107.65 | 10 | 9.3/4/2 |
| 96/242.84 | 0.50/1.27 | 12.06/30.63 | 24.13/61.29 | 90.38/229.57 | 14 | 19.0/8.6 |

Figure 7:
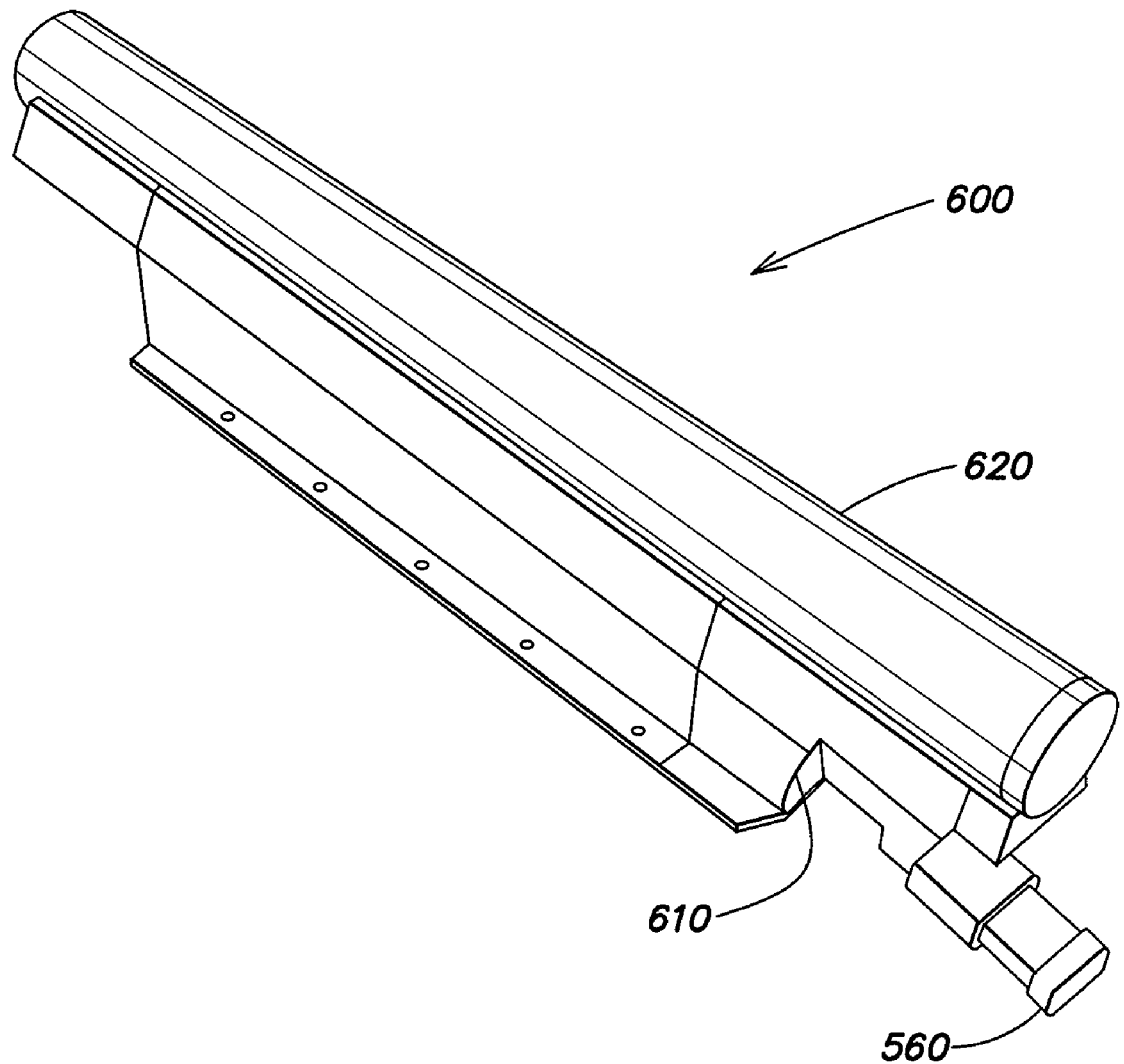

FIG. 9 illustrates an exemplary arrangement of various components of the linear lighting fixture 600 of FIGS. 7 and 8, according to one embodiment of the present disclosure. As illustrated in FIG. 9, a power and control circuit board 550 of the lighting fixture 600 is disposed in a first portion 610 of the fixture (e.g., an extruded aluminum portion). FIG. 9 also shows that three modular LED circuit boards 520A, 520B and 520C are disposed in a second portion 620 of the fixture generally enclosed by the optics casing, wherein each LED circuit board 520A-C includes five multi-channel lighting units 100. An input connector 560A and an output connector 560B carry power from a power source and lighting instructions (i.e., lighting commands or data) to and from the lighting fixture 600, such that multiple lighting fixtures may be coupled together to form a networked lighting system. As mentioned above, the connectors 560A,B include a passageway that allows power and/or data lines to exit the housing at a location other than the end of the housing. In various embodiments of the invention, the connectors 560A, 560B are configured and disposed at the first portion 610 of the cussed above in connection with FIG. 3, which forms part of the power and control circuit board 550 shown in FIG. 9. Generally, the LUC 208 is configured to process the Ethernet-based communications and in turn communicate with the multiple lighting units 100 of the fixture 600 using a serial-based communication protocol, examples of which were discussed above. Accordingly, the LUC 208 essentially functions as a communication protocol converter that receives lighting instructions or data in the Ethernet-based protocol, and passes on the instructions to the multiple lighting units of the fixture using the serial-based protocol.

To this end, the LUC 208 shown in FIG. 9 includes an Ethernet switch 510 that is configured to handle incoming Ethernet-based packet traffic to the fixture 600. In one aspect, the Ethernet switch is configured such that packet traffic may be communicated to and from the fixture at 100 Mbs/sec. The LUC 208 of the lighting fixture 600 is assigned a unique MAC/IP address (and perhaps other unique identifiers such as a serial number and a device name), and the Ethernet switch 510 is configured to identify particular packets in the incoming packet traffic that are specifically intended for the lighting fixture 600 (based on the address and/or other unique identifiers for the lighting fixture). The LUC 208 also includes a microprocessor 570 that receives from the Ethernet switch 510 the particular packets intended for the lighting fixture. In one aspect, the microprocessor 570 may include a built-in 10 Mb Ethernet interface via which the microprocessor and the Ethernet switch are coupled. The microprocessor 570 extracts, from the Ethernet packets it receives, lighting instructions/data for the multiple lighting units of the fixture, and in turn transmits these lighting instructions/data to the lighting units using a serial-based protocol.

As also illustrated in FIG. 9, DC operating power for the multiple lighting units 100 of the lighting fixture 600, as well as the lighting instructions/data in the serial-based protocol, are provided from the power and control circuit board 550 to a first LED circuit board 520A via a wire bundle 540. In one exemplary implementation, the wire bundle 540 has one terminus coupled to the power and control board 550 via an 8-pin connector 545 and another terminus coupled to the first LED circuit board 520A via an 11-pin solder connection. The LED circuit boards 520A, 520B and 520 are modular in nature and include mating and/or interlocking connectors 555 (e.g., 9-pin Samtec connectors) to permit modular serial interconnections of multiple LED circuit boards within a given lighting fixture.

In some embodiments, the LED-based lighting units 100 are disposed on the modular circuit boards 520A, 520B and 520C such that they are spaced apart from each other at a distance of approximately one inch. For example, in one exemplary implementation, each of the LED circuit boards 520A, 520B and 520C shown in FIG. 9 is approximately six inches long and includes five individually controllable lighting units 100 (thereby providing a control resolution within each lighting fixture 600 of approximately 1.2 inches). This precise level of control allows the fixtures 600 to run video, graphics and intricately designed effects in a host of architectural and entertainment settings.

Figure 11:
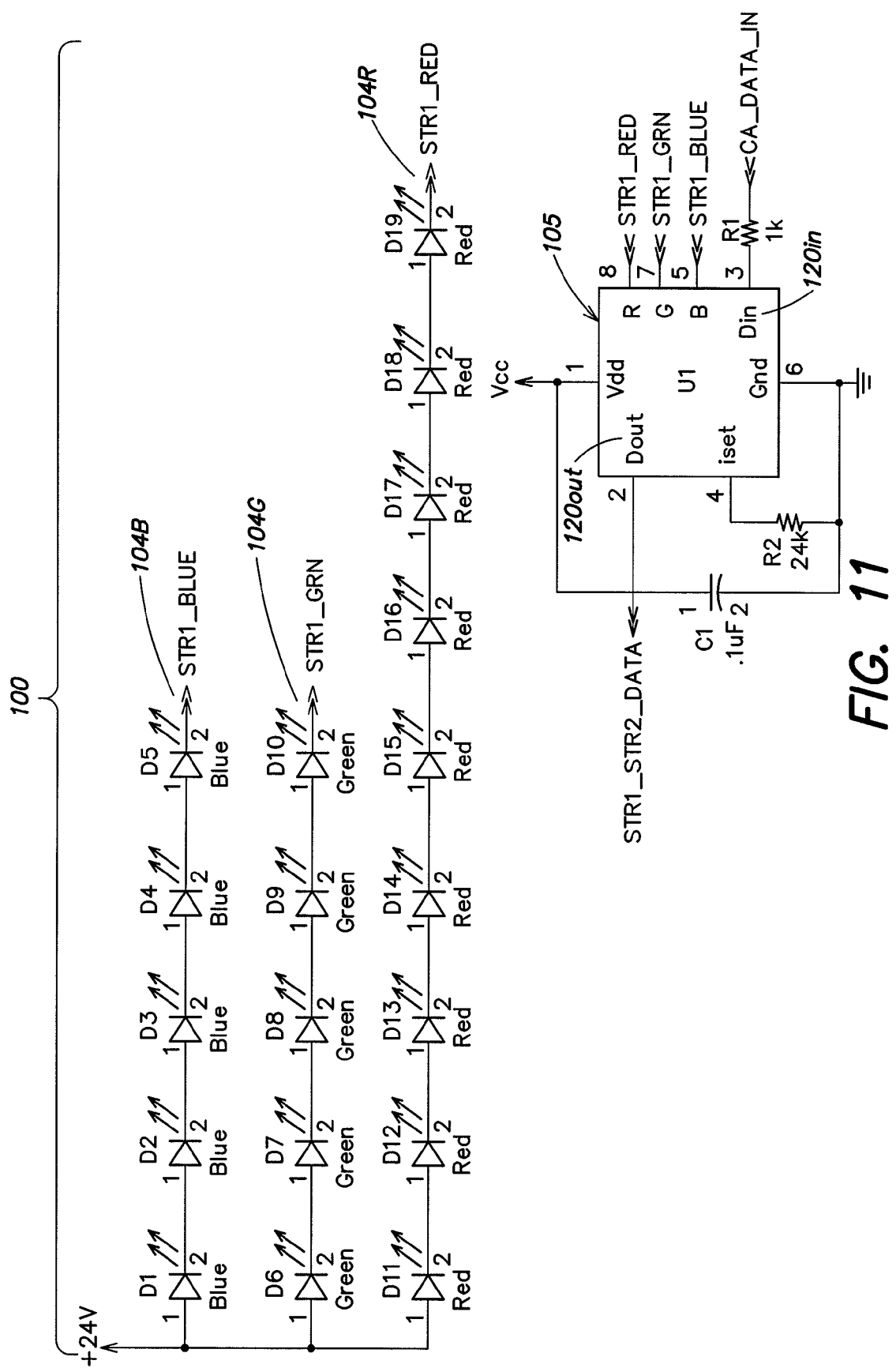
FIG. 11 illustrates one specific example of an R-G-B lighting unit that may be employed in the lighting fixture of FIG. 9.

In some versions of this implementation, each of the lighting units 100 may be a three channel R-G-B lighting unit. FIG. 11 illustrates one specific example of an R-G-B lighting unit 100 representative of the lighting units of a given LED circuit board, in which a red channel of each lighting unit includes nine red LEDs 104R connected in series, a green channel includes five green LEDs 104G connected in series, and a blue channel includes five blue LEDs 104B connected in series. In another version shown in FIG. 11, the controller 105 of each lighting unit 100 may be implemented as an application-specific integrated circuit (ASIC) designed to specifically process a stream of lighting instructions/data received at an input communication port $120_{IN}$ according to the "data stripping/extraction" process or "flag modification" process discussed above in connection with exemplary serial-based communication protocols, and pass on a stream of lighting instructions/data via an output communication port $120_{OUT}$ to a subsequent lighting unit in a series interconnection. More specifically, the five lighting units 100 of each LED circuit board 520A, 520B and 520C are coupled together in a series interconnection, and the circuit boards are in turn also coupled together in a series interconnection via the connectors 555, such that the entire collection of fifteen lighting units are serially-interconnected, wherein each lighting unit includes an ASIC-implemented controller 105 having the functionality of the processor 102, the memory 114 and communication port(s) 120 shown in FIG. 1.

Figure 12A:
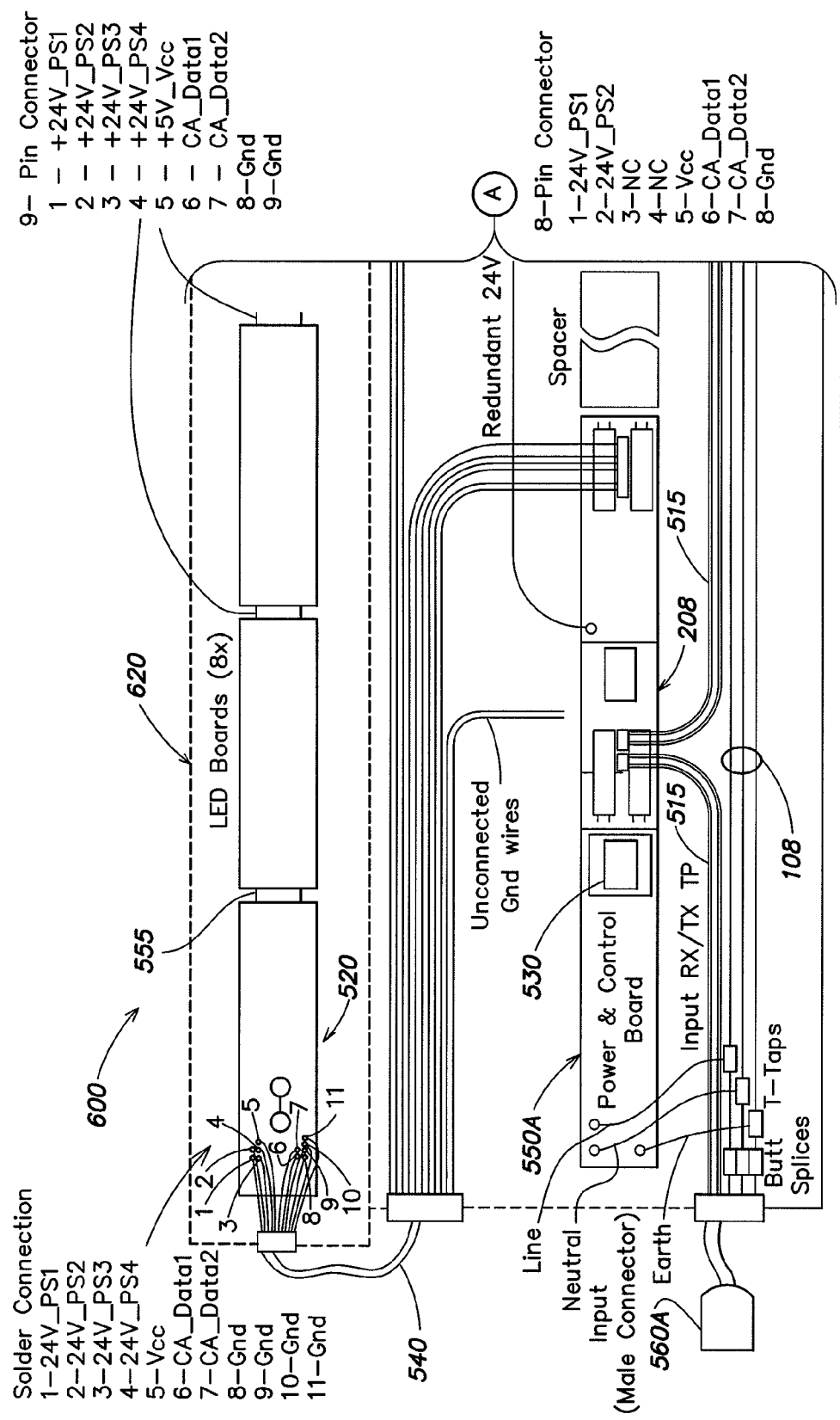
FIG. 12 illustrates an exemplary arrangement of various components of the linear lighting fixture of FIGS. 7 and 8, according to another embodiment of the present invention.
Figure 12B:
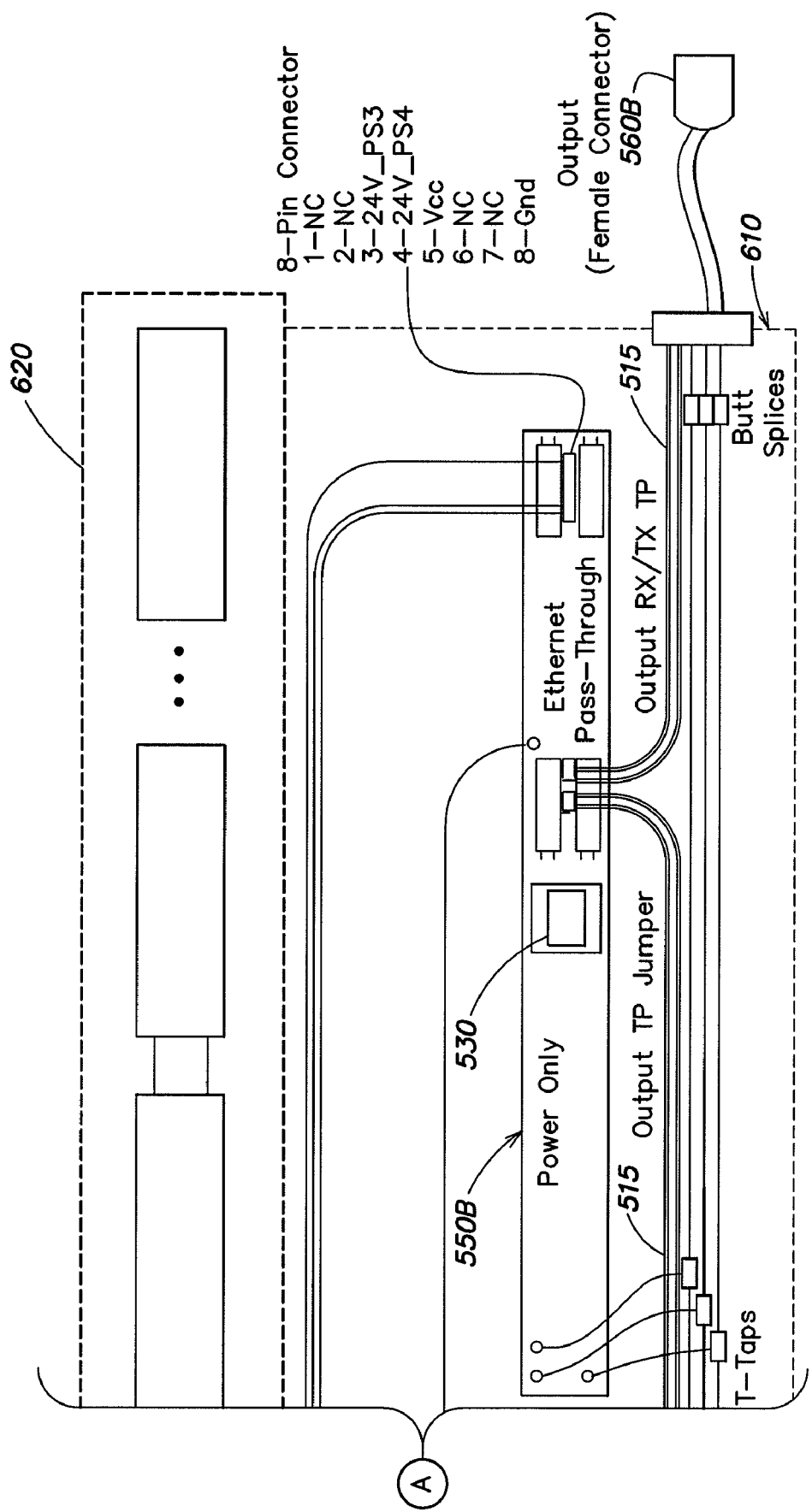

FIG. 12 illustrates an exemplary arrangement of various components of the linear lighting fixture 600 of FIGS. 7 and 8, according to another embodiment of the present disclosure. The fixture shown in FIG. 12 is a larger version of that shown in FIG. 9, in which eight modular LED circuit boards 520 are disposed in an area of the fixture generally enclosed by the optics casing 610, and wherein two power and control circuit boards 550A and 550B are disposed in an area of the fixture generally defined by the aluminum housing 620. Like the LED circuit boards 520, in one aspect the power and control circuit boards 550A and 550B are modular in nature. However, in embodiments in which multiple power and control boards are employed in a given fixture, generally only one of the multiple power and control boards includes a LUC 208, while all of the boards include a switching power supply 530. This ensures that a given lighting fixture has only one address for Ethernet-based communications, but at the same time adequate power can be provided to the lighting units and circuitry of the lighting fixture (in one exemplary implementation, each LED board 520 consumes approximately 4 Watts of power, and each switching power supply 520 provides approximately 20 Watts of power; accordingly, a fixture with eight LED circuit boards 520 requires two switching power supplies 530).

Figure 13:
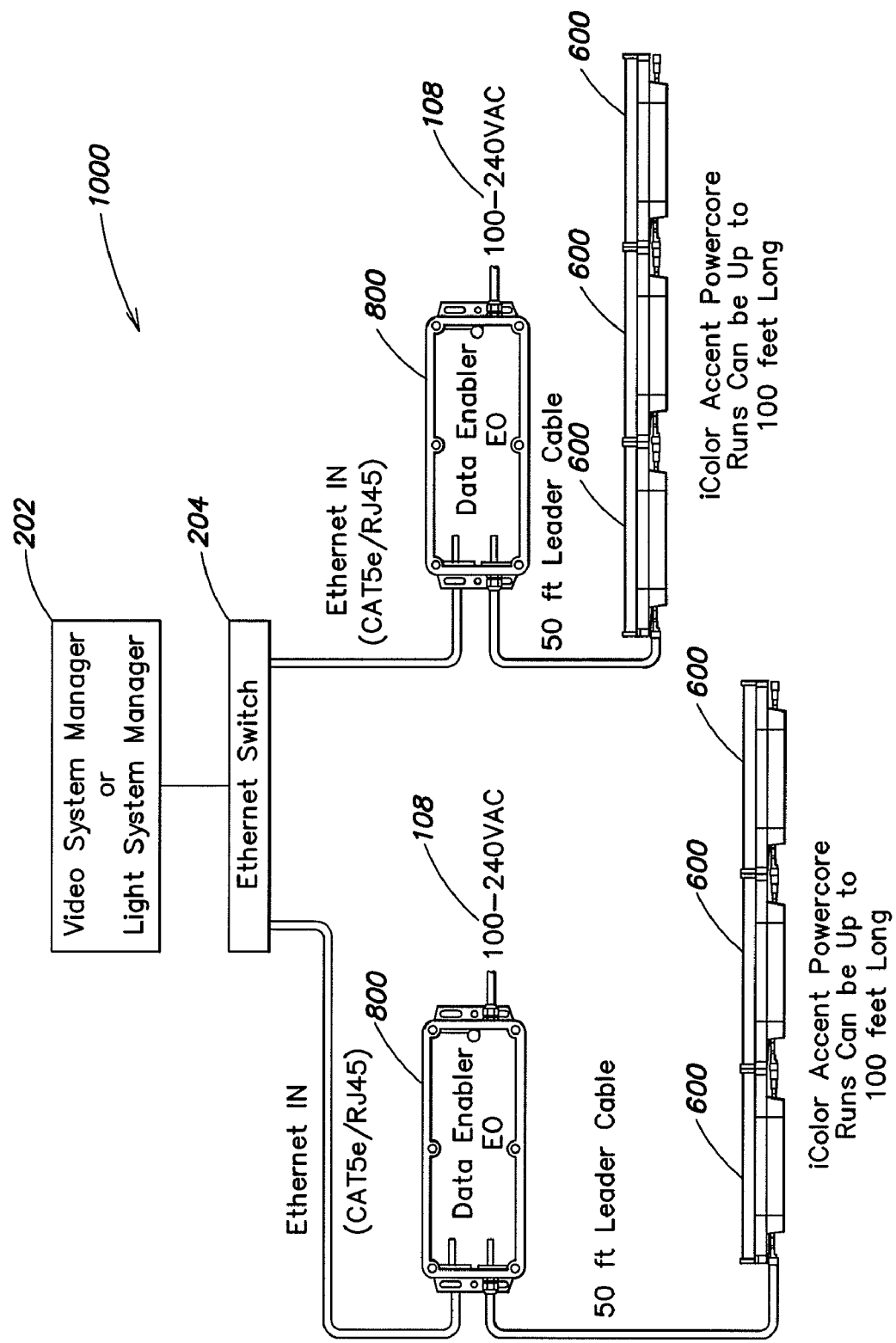
FIG. 13 illustrates a networked lighting system comprising multiple lighting fixtures similar to those shown in FIGS. 9 and 12, according to one embodiment of the present invention.

FIG. 13 illustrates a networked lighting system 1000 comprising multiple lighting fixtures 600 similar to those shown in FIGS. 9 and 12, according to one embodiment of the present invention. Generally, the lighting system 1000 shares some features of the lighting network discussed above in connection with FIG. 3, wherein each of the lighting fixtures 600 includes a LUC 208 and multiple lighting units 100. In the system 1000 of FIG. 13, a central controller 202 is coupled via an Ethernet switch 204 to multiple power/data junction boxes 800 which accept power 108 from a standard A.C. line voltage as well as Ethernet-based communications from the Ethernet switch 204, and in turn provide both the Ethernet-based communications and the line voltage via a single cable to respective "strings" of interconnected lighting fixtures 600 (via an input connector 560A of one of the lighting fixtures). In one aspect of this embodiment, the central controller may be implemented as a "light system manager" or a "video system manager" as described in detail in U.S. Patent Application Publication No. 2005-0248299, published Nov. 10, 2005, entitled "Light System Manager;" to provide precision lighting control of each lighting unit within each lighting fixture 600 of the system 1000. As mentioned above, this precise level of control allows the fixtures 600 to run video, graphics and intricately designed effects in a host of architectural and entertainment settings.

In one exemplary implementation of the lighting system 1000 shown in FIG. 13, the lighting fixtures may be arranged in one or two-dimensional arrays (as shown for example in FIGS. 4-6), wherein each lighting unit of each lighting fixture may be controlled to provide a wide variety of lighting effects (e.g., in one example, with a controllable resolution of 1.2 inch increments as discussed above in connection with FIG. 9). In this manner, a two-dimensional array formed by multiple lighting fixtures 600 of the system 1000 also may provide a large scale text, graphics, and/or video reproduction system, in which each lighting unit of a given lighting fixture, or groups of lighting units, may be controlled as individual pixels of a display to reproduce text, graphics, and/or video content. The lighting system 1000 also may be flexibly deployed in a three-dimensional environment, for example, on multiple sides of a building, as well as outlining all or a portion of a perimeter of a building or various architectural features of other interior or exterior spaces, to provide controllable multi-color lighting in these environments. Also, as discussed above in connection with FIG. 2, it should be appreciated that lighting fixtures similar to those discussed herein in connection with FIGS. 9 and 12 may be implemented with other form factors, such as curvilinear configurations, branched configurations, v-configurations, and the like, to provide a wide variety of system implementation possibilities in a number of environments.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Various embodiments of the present invention are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting fixture, comprising:
 a housing having a least a first portion and a second portion;
 at least one power and control circuit board disposed in the first portion of the housing, the at least one power and control circuit board comprising:
  at least one switching power supply for receiving an A.C. line voltage and providing a D.C. output voltage; and
  a communication protocol converter for receiving first lighting instructions formatted according to a first communication protocol and converting at least some of the first lighting instructions to second lighting instructions formatted according to a second communication protocol; and
 a plurality of modular circuit boards disposed in the second portion of the housing and coupled to the at least one power and control circuit board, each modular circuit board of the plurality of modular circuit boards comprising a plurality of LED-based lighting units coupled to the D.C. output voltage and responsive to the second lighting instructions formatted according to the second communication protocol.

2. The lighting fixture of claim 1, wherein the first portion of the housing comprises an extruded aluminum portion, and wherein the second portion of the housing comprises a translucent optics casing.

3. The lighting fixture of claim 1, wherein the plurality of LED-based lighting units are individually and independently responsive to the second lighting instructions, each LED-based lighting unit comprising:
- at least one first LED for generating first radiation having a first spectrum;
- at least one second LED for generating second radiation having a second spectrum different from the first spectrum; and
- at least one controller for controlling at least a first intensity of the first radiation and a second intensity of the second radiation in response to at least some of the second lighting instructions.

4. The lighting fixture of claim 1, wherein the first communication protocol is an Ethernet-based protocol, and wherein the second communication protocol is a serial-based protocol.

5. The lighting fixture of claim 1, wherein the at least one power and control circuit board comprises:
- a first power and control circuit board comprising:
  - a first switching power supply for receiving the A.C. line voltage and providing the D.C. output voltage; and
  - the communication protocol converter; and
- at least a second power and control circuit board comprising at least one second switching power supply for receiving the A.C. line voltage and providing the D.C. output voltage,
- wherein the lighting fixture does not include any other communication protocol converter.

6. The lighting fixture of claim 1, further comprising:
- an input connector coupled to the housing for receiving the A.C. line voltage and the first lighting instructions; and
- an output connector coupled to the housing for providing the A.C. line voltage and the first lighting instructions,
- such that the lighting fixture may be coupled in a daisy-chain fashion to at least one other lighting fixture to form a networked lighting system.

7. A lighting system, comprising:
- a first plurality of serially-connected modular lighting fixtures, at least a first modular lighting fixture of the first plurality of serially-connected modular lighting fixtures configured to receive both an A.C. line voltage and Ethernet-based communications via a first single multiple-conductor cable, each modular lighting fixture comprising:
- at least one switching power supply to convert the A.C. line voltage to a D.C. output voltage;
- a communication protocol converter to convert the Ethernet-based communications to lighting instructions formatted according to a serial-based protocol; and
- a plurality of serially-connected LED-based lighting units coupled to the D.C. voltage for generating variable color, variable color temperature, and/or variable intensity light based on the lighting instructions formatted according to the serial-based protocol.

8. The lighting system of claim 7, further comprising:
- a second plurality of serially-connected modular lighting fixtures, at least a first modular lighting fixture of the second plurality of serially-connected modular lighting fixtures configured to receive both the A.C. line voltage and the Ethernet-based communications via a second single multiple-conductor cable;
- the first single multiple-conductor cable;
- the second single multiple-conductor cable; and
- at least one Ethernet switch coupled to the first plurality of serially-connected modular lighting fixtures via the first single multiple-conductor cable, the at least one Ethernet switch coupled to the second plurality of serially-connected modular lighting units via the second single multiple-conductor cable.

9. The lighting system of claim 8, wherein the first and second pluralities of serially-connected modular lighting fixtures are collectively arranged as a two-dimensional array.

10. The lighting system of claim 9, wherein the two-dimensional array provides a text, graphics, and/or video reproduction display system, and wherein each lighting unit of the plurality of serially-connected lighting units of each modular lighting fixture is an individually and independently controllable pixel of the display system.

11. The lighting system of claim 8, wherein the first and second pluralities of serially-connected modular lighting fixtures are collectively disposed in a three-dimensional arrangement.

12. The lighting system of claim 8, wherein at least some modular lighting fixtures of the first and second pluralities of serially-connected modular lighting fixtures are disposed so as to outline at least one architectural feature.

\* \* \* \* \*